(12) United States Patent
Shimizu

(10) Patent No.: US 11,618,255 B2
(45) Date of Patent: Apr. 4, 2023

(54) LIQUID DISCHARGING APPARATUS, LIQUID DISCHARGING METHOD, AND INKJET PRINTING METHOD

(71) Applicant: Takayuki Shimizu, Kanagawa (JP)

(72) Inventor: Takayuki Shimizu, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 37 days.

(21) Appl. No.: 17/406,159

(22) Filed: Aug. 19, 2021

(65) Prior Publication Data

US 2022/0088927 A1    Mar. 24, 2022

(30) Foreign Application Priority Data

Sep. 18, 2020 (JP) .............................. JP2020-156955

(51) Int. Cl.
| | | |
|---|---|---|
| *B41J 2/14* | (2006.01) | |
| *B41J 2/175* | (2006.01) | |
| *C09D 11/38* | (2014.01) | |

(52) U.S. Cl.
CPC .......... *B41J 2/14201* (2013.01); *B41J 2/175* (2013.01); *C09D 11/38* (2013.01)

(58) Field of Classification Search
CPC ..... C09D 11/322; C09D 11/102; C09D 11/38; B41J 2/14274; B41J 2/18; B41J 2/14201; B41J 2/175; B41J 2202/12; B41J 2002/14403; B41J 2002/14362; B41J 2002/14419
See application file for complete search history.

(56) References Cited

U.S. PATENT DOCUMENTS

| | | |
|---|---|---|
| 2014/0002539 A1 | 1/2014 | Goto et al. |
| 2017/0174919 A1 | 6/2017 | Kido et al. |
| 2019/0284418 A1 | 9/2019 | Kamon |
| 2020/0207141 A1 | 7/2020 | Seguchi |

FOREIGN PATENT DOCUMENTS

| | | |
|---|---|---|
| EP | 3674479 | 7/2020 |
| JP | 2012-207202 | 10/2012 |
| JP | 2016-117975 | 6/2016 |
| JP | 2018-039946 | 3/2018 |
| JP | 2019-155838 | 9/2019 |

OTHER PUBLICATIONS

Extended European Search Report dated Feb. 3, 2022 in European Application No. 21192550.8, 7 pages.

*Primary Examiner* — An H Do
(74) *Attorney, Agent, or Firm* — Grüneberg and Myers PLLC

(57) ABSTRACT

Provided is a liquid discharging apparatus including a container containing a liquid composition containing water, an organic solvent, and a polyurethane resin, and a discharging head. The discharging head includes: an individual liquid chamber including a circulation flow path through which the liquid composition circulates; and a nozzle communicating with the individual liquid chamber and through which a liquid droplet of the liquid composition is discharged. The solid content of the polyurethane resin in the liquid composition is 7.0% by mass or greater but 20.0% by mass or less.

14 Claims, 9 Drawing Sheets

LIQUID DISCHARGING APPARATUS, LIQUID DISCHARGING METHOD, AND INKJET PRINTING METHOD

CROSS-REFERENCE TO RELATED APPLICATIONS

This patent application is based on and claims priority pursuant to 35 U.S.C. § 119(a) to Japanese Patent Application No. 2020-156955, filed on Sep. 18, 2020, in the Japan Patent Office, the entire disclosure of which is hereby incorporated by reference herein.

BACKGROUND

Technical Field

The present disclosure relates to a liquid discharging apparatus, a liquid discharging method, and an inkjet printing method.

Description of the Related Art

Inkjet recording methods have simpler processes and higher adaptability to full-color operations, and can form higher-resolution images with simpler device configurations than other recording methods. Therefore, inkjet recording methods are becoming spread from personal and office uses to industrial printing fields.

The industrial printing fields require high productivity, and need to improve fastness properties such as water resistance and wear resistance particularly for such uses as wallpaper, wall cloth, and home decoration.

Generally, various resins are added in ink compositions in order to impart functions. It is known that fastness properties improve as the amount of resins added is increased. However, as the amount of resins added is increased, the inks become dryable. Therefore, for example, adhesion of the inks to the head nozzle surfaces is likely to occur and discharging reliability degrades.

SUMMARY

According to an embodiment of the present disclosure, a liquid discharging apparatus includes a container containing a liquid composition containing water, an organic solvent, and a polyurethane resin, and a discharging head. The discharging head includes: an individual liquid chamber including a circulation flow path through which the liquid composition circulates; and a nozzle communicating with the individual liquid chamber and through which a liquid droplet of the liquid composition is discharged. The solid content of the polyurethane resin in the liquid composition is 7.0% by mass or greater but 20.0% by mass or less.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
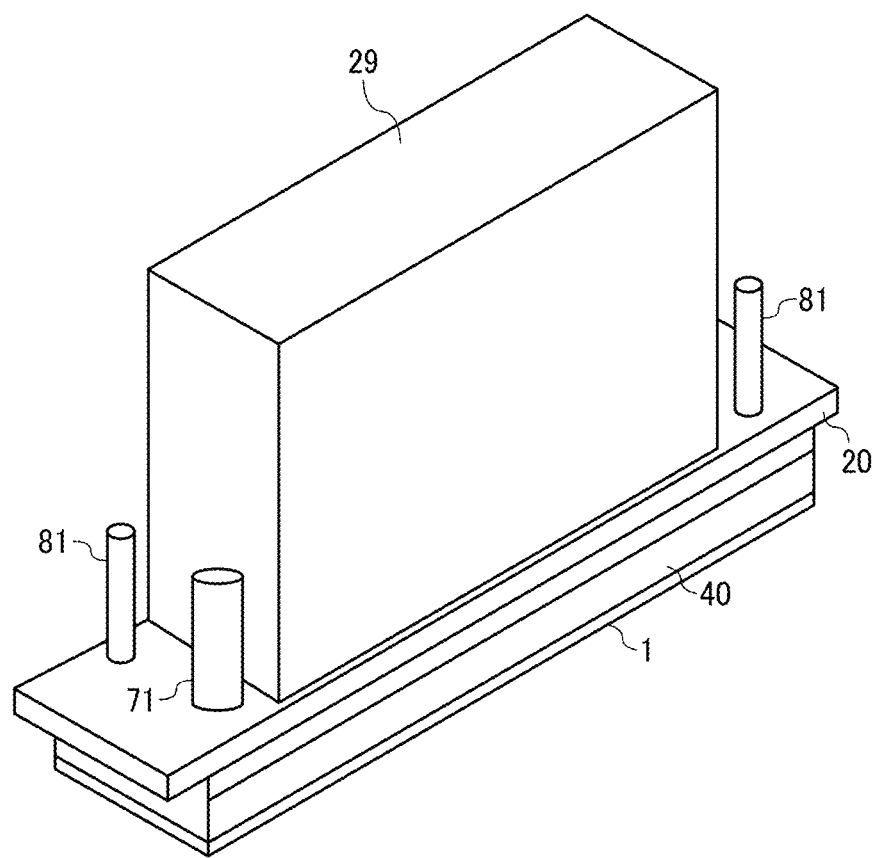
FIG. 1 is an outer perspective view illustrating an example of a discharging head of a liquid discharging apparatus of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The present disclosure can provide a liquid discharging apparatus that has a high discharging reliability and can form a discharged matter excellent in non-transferability and scratch resistance.

(Liquid Discharging Apparatus and Liquid Discharging Method)

A liquid discharging apparatus of the present disclosure includes a container containing a liquid composition containing water, an organic solvent, and a polyurethane resin, and a discharging head. The discharging head includes: an individual liquid chamber including a circulation flow path through which the liquid composition circulates; and a nozzle communicating with the individual liquid chamber and through which a liquid droplet of the liquid composition is discharged. The solid content of the polyurethane resin in the liquid composition is 7% by mass or greater but 20.0% by mass or less. The liquid discharging apparatus further includes other units as needed.

A liquid discharging method of the present disclosure includes a discharging step of circulating a liquid composition containing water, an organic solvent, and a polyurethane resin through an individual liquid chamber and discharging a liquid droplet of the liquid composition through a nozzle of a discharging head. The solid content of the polyurethane resin in the liquid composition is 7% by mass or greater but 20.0% by mass or less. The liquid discharging method further includes other steps as needed.

The liquid discharging method of the present disclosure can be suitably performed by the liquid discharging apparatus of the present disclosure. The discharging step can be performed by the discharging head. The other steps can be performed by the other units.

The liquid discharging method of the present disclosure and the liquid discharging apparatus of the present disclosure are suitably used as an inkjet printing method and an inkjet printing apparatus that use an ink as the liquid composition.

Existing techniques have a printing step of forming an ink adsorptive layer before inkjet printing, and need many operation steps and have a problem in satisfying both of a high productivity and fastness properties.

As a result of earnest studies, the present inventor has achieved the present invention based on a finding that it is possible to obtain a high discharging reliability and a discharged matter (printed matter) excellent in non-transferability and scratch resistance, by discharging a liquid droplet of a liquid composition using a liquid discharging apparatus including a discharging head having a circulation mechanism, where the liquid composition contains water, an organic solvent, and a polyurethane resin, and the solid content of the polyurethane resin in the liquid composition is 7% by mass or greater but 20.0% by mass or less.

The liquid composition used in the liquid discharging method of the present disclosure and the liquid discharging apparatus of the present disclosure will be described below in detail.

<Liquid Composition>

The liquid composition contains water, an organic solvent, and a polyurethane resin, preferably contains a coloring material, and further contains other components as needed.

—Polyurethane Resin—

Examples of the polyurethane resin include, but are not limited to, polycarbonate polyurethane resins, polyether polyurethane resins, polyester polyurethane resins, and polyester polycarbonate polyurethane resins. One of these polyurethane resins may be used alone or two or more of these polyurethane resins may be used in combination. Among these polyurethane resins, polycarbonate polyurethane resins and polyester polyurethane resins are preferable in terms of improving fastness properties of a coating film and improving scratch resistance thereof particularly. It is particularly preferable to use polycarbonate polyurethane resins and polyester polyurethane resins in combination.

It is preferable to use a polycarbonate polyurethane resin having a glass transition temperature (Tg) of from −10 degrees C. or lower but −30 degrees C. or higher as the polyurethane resin because a high discharging reliability can be obtained. It is preferable to use a polyester polyurethane resin having a glass transition temperature (Tg) of 50 degrees C. or higher but 60 degrees C. or lower because a printed matter excellent in high fastness properties can be obtained. It is particularly preferable to use these two kinds of polyurethane resins in combination.

The glass transition temperature (Tg) of the polyurethane resin can be measured with, for example, a differential scanning calorimeter (TA-60WS and DSC-60, available from Shimadzu Corporation). Specifically, a polyurethane resin (4.0 mg) is put in a sample container formed of aluminum, and the sample container is put on a holder unit and set in an electric furnace. Next, under a nitrogen atmosphere, the sample is subjected to temperature elevation from 0 degrees C. to 150 degrees C. at a temperature elevation rate of 10 degrees C./min, then subjected to temperature reduction from 150 degrees C. to −80 degrees C. at a temperature reduction rate of 5 degrees C./min, and then further subjected to temperature elevation to 150 degrees C. at a temperature elevation rate of 10 degrees C./min, to measure a DSC curve. Based on the obtained DSC curved, a glass transition temperature (Tg) is obtained by an analysis according to a mid-point method from an inflection point during the second temperature elevation, using an analyzing program of the DSC-60 system.

As the polyurethane resin, an appropriately synthesized product may be used or a commercially available product may be used. Examples of the commercially available product include, but are not limited to, TAKELAC WS-4000, W-6010, W-5030. W-635, W-6110, WS-5000, WS-5100, WS-4022, and WS-5984 (all available from Mitsui Chemicals, Inc.).

Among these commercially available products, TAKELAC W-6110 (with Tg of −20 degrees C.) is particularly preferable as a commercially available product of a polycarbonate polyurethane resin having a glass transition temperature (Tg) of −10 degrees C. or lower but −30 degree C. or higher, and TAKELAC WS-5000 (with Tg of 60 degrees C.) is particularly preferable as a commercially available product of a polyester polyurethane resin having a glass transition temperature (Tg) of 50 degrees C. or higher but 60 degrees C. or lower.

The solid content of the polyurethane resin is 7% by mass or greater but 20.0% by mass or less and preferably 7.2% by mass or greater but 15% by mass or less relative to the total amount of the liquid composition. It is preferable that the solid content of the polyurethane resin be 7% by mass or greater but 20.0% by mass or less, because a high discharging reliability and a printed matter excellent in high fastness properties can be obtained.

The liquid composition may contain other resins than the polyurethane resin.

The other resins are not particularly limited and may be appropriately selected depending on the intended purpose. Specific examples thereof include, but are not limited to, polyester resins, acrylic-based resins, vinyl acetate-based resins, styrene-based resins, butadiene-based resins, styrene-butadiene-based resins, vinylchloride-based resins, acrylic styrene-based resins, and acrylic silicone-based resins.

Particles of such resins may be also used. It is possible to mix a resin emulsion in which the resin particles are dispersed in water serving as a dispersion medium with materials such as a coloring agent and an organic solvent to obtain ink. The resin particle can be synthesized or is available on the market. It is possible to synthesize the resin particle or obtain from market. These can be used alone or in combination of the resin particles.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using a particle size analyzer (Nanotrac Wave-UT151, manufactured by MicrotracBEL Corp.).

The particle diameter of the solid portion in ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density.

The solid portion includes resin particles, particles of pigments, etc. The particle diameter of the solid portion can be measured by using a particle size analyzer (Nanotrac Wave-UT151, manufactured by MicrotracBEL Corp).

—Organic Solvent—

There is no specific limitation on the type of the organic solvent used in the present disclosure. For example, water-soluble organic solvents are suitable. Specific examples thereof include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

Since the water-soluble organic solvent serves as a humectant and also imparts a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethylene glycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

<Water>

The water is not particularly limited and may be appropriately selected depending on the intended purpose. Examples of the water include, but are not limited to, pure water such as ion-exchanged water, ultrafiltrated water, reverse osmotic water, and distilled water, and ultrapure water. One of these kinds of water may be used alone or two or more of these kinds of water may be used in combination.

The proportion of water has no particular limit and can be suitably selected to suit to a particular application. In terms of the drying property and discharging reliability of the liquid composition, the proportion is preferably from 10 to 90 percent by mass and more preferably from 20 to 60 percent by mass.

<Coloring Material>

The pigment includes inorganic pigments and organic pigments. These can be used alone or in combination. In addition, it is possible to use a mixed crystal.

As the pigments, for example, black pigments, yellow pigments, magenta pigments, cyan pigments, w % bite pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4 (Phthalocyanine Blue), 16, 17:1, 56, 60, and 63; and C.I. Pigment Green 1, 4, 7, 8, 10, 17, 18, and 36.

To obtain the ink, the pigment is dispersed by, for example, preparing a self-dispersible pigment by introducing a hydrophilic functional group into the pigment, coating the surface of the pigment with resin, or using a dispersant.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by microcapsules to make the pigment dispersible in water. This can be referred to as a resin-coated pigment. In this case, the pigment to be added to the liquid composition is not necessarily wholly coated with resin. Pigments partially or wholly uncovered with resin may be dispersed in the liquid composition unless the pigments have an adverse impact.

To use a dispersant, for example, a known dispersant of a small molecular weight type or a high molecular weight type represented by a surfactant is used to disperse the pigments in ink. As the dispersant, it is possible to use, for example, anionic surfactants, cationic surfactants, nonionic surfactants, amphoteric surfactants, etc. depending on the pigments.

Also, a nonionic surfactant (RT-100, manufactured by TAKEMOTO OIL & FAT CO., LTD.) and a formalin condensate of naphthalene sodium sulfonate are suitable as dispersants.

These dispersants can be used alone or in combination.

<Pigment Dispersion>

The liquid composition can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture the liquid composition.

The pigment dispersion is obtained by mixing and dispersing water, pigment, pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably from 20 to 500 nm and more preferably from 20 to 150 nm to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the content is preferably from 0.1 to 50 percent by mass and more preferably from 0.1 to 30 percent by mass.

During the production, coarse particles are optionally filtered off from the pigment dispersion with a filter, a centrifuge, etc. preferably followed by degassing.

—Other Components—

Examples of the other components include, but are not limited to, a surfactant, a defoaming agent, a preservative and fungicide, a corrosion inhibitor, a pH regulator, etc.

—Surfactant—

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application. Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene poly oxypropylene group as a modifying group is particularly preferable because such an agent demonstrates good characteristics as an aqueous surfactant. It is possible to use a polyether-modified silicone-based surfactant as the silicone-based surfactant.

A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The proportion of the surfactant is not particularly limited and can be suitably selected to suit to a particular application. It is preferably from 0.001 to 5 percent by mass and more preferably from 0.05 to 5 percent by mass relative to the total amount of the liquid composition in terms of excellent wettability and discharging stability and improvement on image quality.

—Defoaming Agent—

The defoaming agent has no particular limit. For example, silicone-based defoaming agents, polyether-based defoaming agents, and aliphatic acid ester-based defoaming agents are suitable. These can be used alone or in combination. Of these, silicone-based defoaming agents are preferable to easily break foams.

—Preservatives and Fungicides—

The preservatives and fungicides are not particularly limited. A specific example is 1,2-benzisothiazolin-3-on.

—Corrosion Inhibitor—

The corrosion inhibitor has no particular limit. Examples thereof are acid sulfite and sodium thiosulfate.

—pH regulator—

The pH regulator has no particular limit. It is preferable to adjust the pH to 7 or higher. Specific examples thereof include, but are not limited to, amines such as diethanol amine and triethanol amine.

The property of the liquid composition is not particularly limited and can be suitably selected to suit to a particular application. For example, viscosity, surface tension, pH, etc., are preferably in the following ranges.

The viscosity of the liquid composition at 25 degrees C. is preferably from 5 to 30 mPa·s and more preferably from 5 to 25 mPa·s to improve print density and text quality and obtain good dischargibility. The viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Number of rotations: 50 rotations per minute (rpm)
−25 degrees C.
Measuring time: three minutes The surface tension of the liquid composition is preferably 35 mN/m or less and more preferably 32 mN/m or less at 25 degrees C. in terms that the liquid composition is suitably levelized on a print medium and the drying time of the liquid composition is shortened.

The pH of the liquid composition is preferably from 7 to 12 and more preferably from 8 to 11 in terms of prevention of corrosion of metal materials contacting the ink.

<Liquid Discharging Apparatus>

A liquid discharging apparatus of the present disclosure includes a container containing a liquid composition containing water, an organic solvent, and a polyurethane resin, and a liquid discharging head. The liquid discharging head includes: an individual liquid chamber including a circulation flow path through which the liquid composition circulates; and a nozzle communicating with the individual liquid chamber and through which a liquid droplet is discharged. The liquid discharging apparatus further includes other units as needed.

It is preferable that the discharging head include a pressure sensor configured to detect the pressure of the liquid composition and a circulation speed control unit configured to control a circulation speed of the liquid composition, and that the circulation speed be controlled to adjust the pressure of the liquid composition to a target pressure. In this way, the liquid discharging apparatus can suppress drying of the liquid composition and maintain the liquid composition in a uniformly dispersed state.

When a detected value of the pressure sensor is lower than the target pressure, it is preferable that the circulation speed control unit increase the circulation speed, for suppressing drying of the liquid composition.

It is preferable that the discharging head include a piezo element configured to discharge a liquid droplet, and that the pressure sensor and the piezo element be formed as an integrated body.

It is preferable to detect the pressure of the liquid composition by applying a load to the liquid composition in the discharging direction within load levels beyond which the piezo element discharges the liquid composition.

Even when the discharging head is not discharging the liquid composition, it is preferable to control the circulation speed based on a detected value of the pressure sensor.

Figure 2:
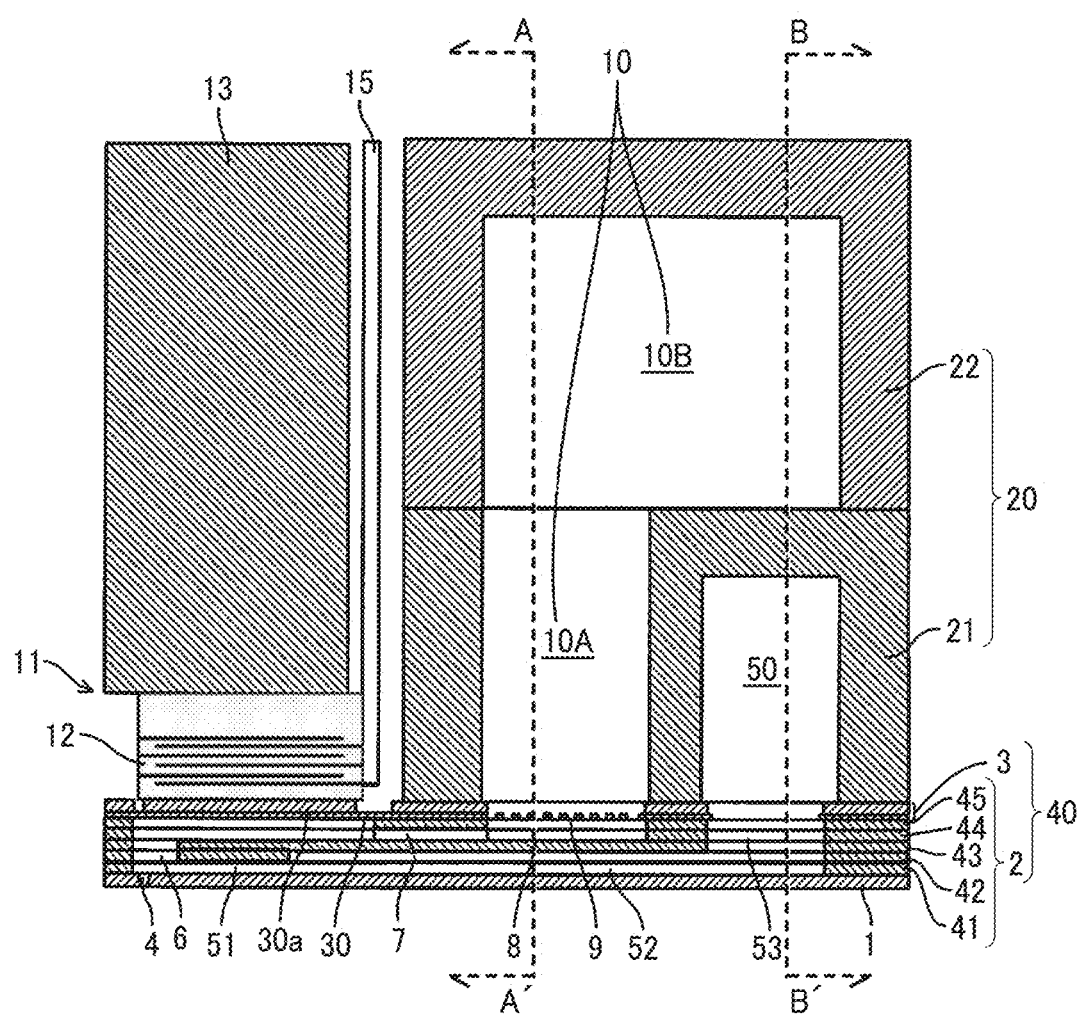
FIG. 2 is a cross-sectional view of a discharging head of a liquid discharging apparatus of the present disclosure, taken along a direction orthogonal to a nozzle array direction.
Figure 3:
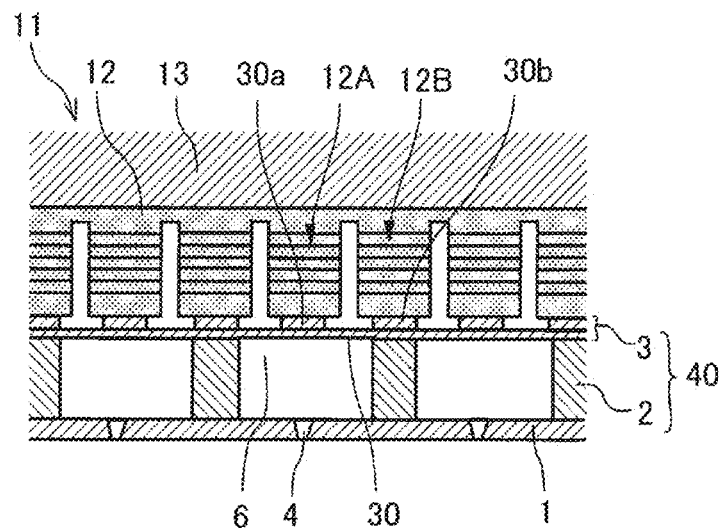
FIG. 3 is a partial cross-sectional view of a discharging head of a liquid discharging apparatus of the present disclosure, taken along a direction parallel with a nozzle array direction.
Figure 4:
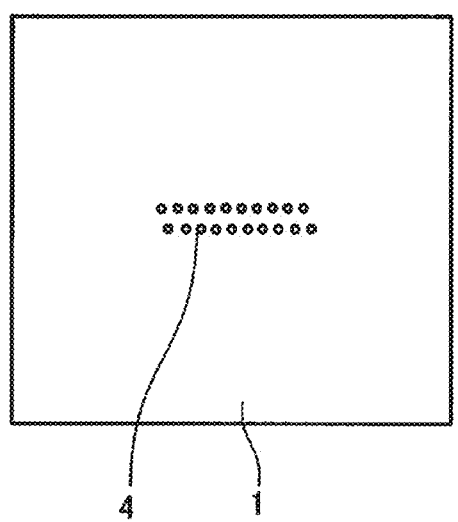
FIG. 4 is a plan view of a nozzle plate of a discharging head of a liquid discharging apparatus of the present disclosure.
Figure 6A:
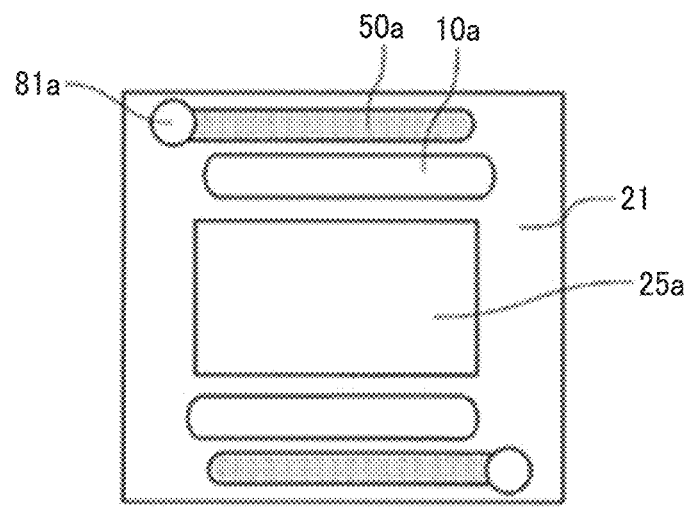
FIG. 6A is a plan view of each member constituting a common liquid chamber member of a discharging head of a liquid discharging apparatus of the present disclosure.
Figure 6B:
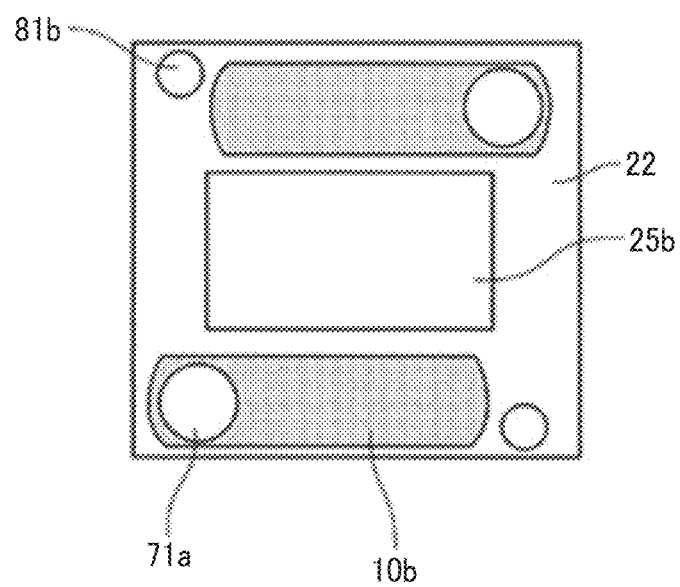
FIG. 6B is a plan view of each member constituting a common liquid chamber member of a discharging head of a liquid discharging apparatus of the present disclosure.
Figure 7:
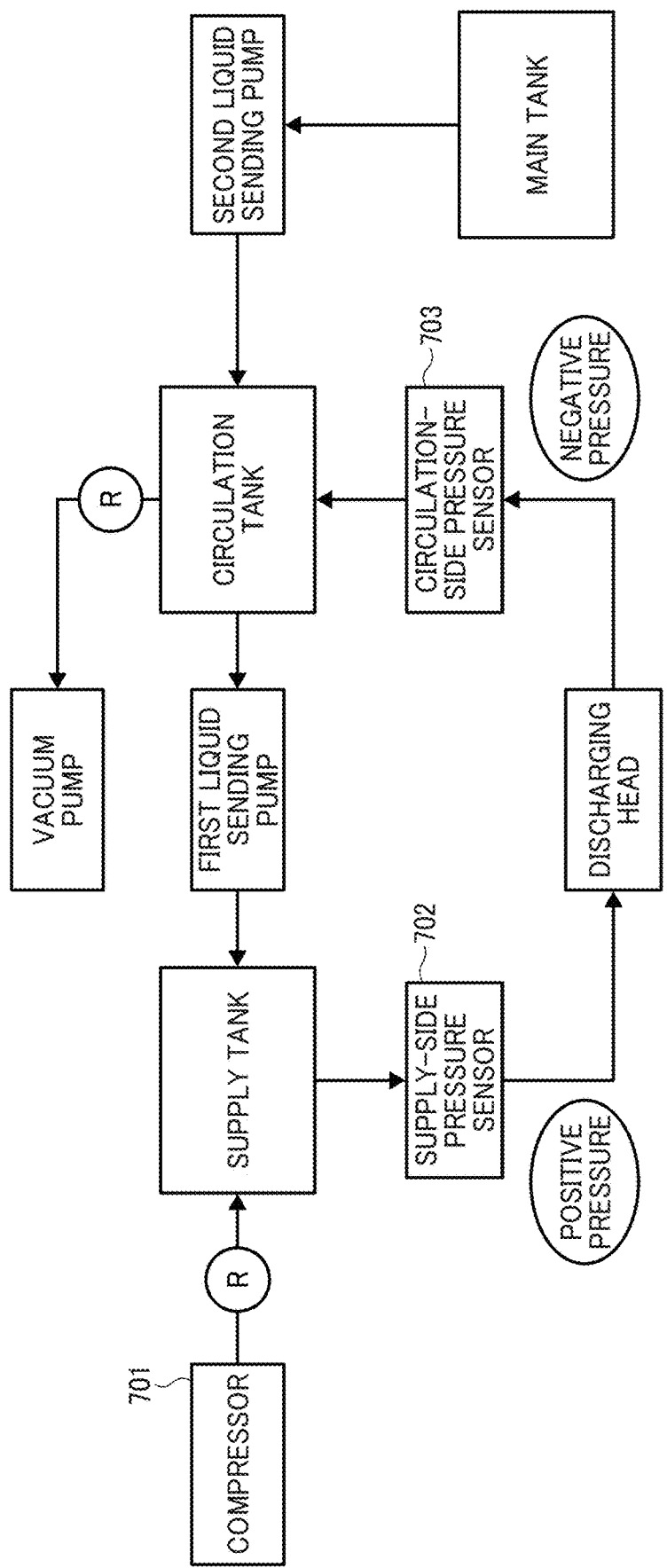
FIG. 7 is a block diagram illustrating an example of a liquid circulation system of the present disclosure.
Figure 8:
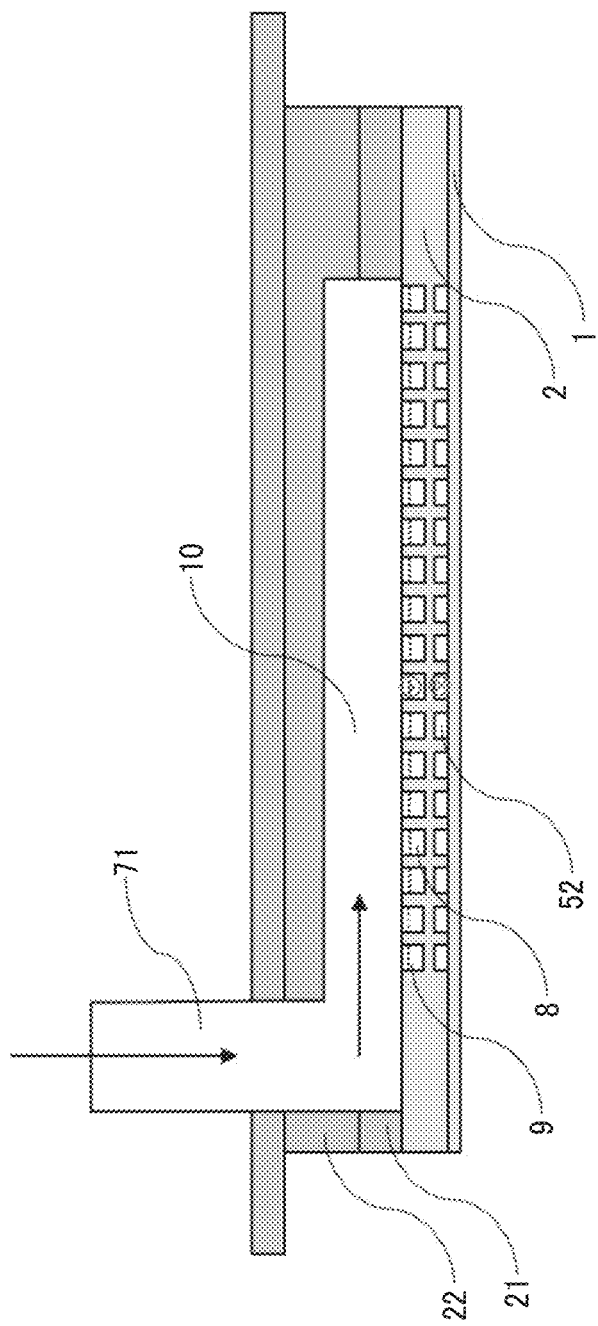
FIG. 8 is a cross-sectional view taken along a line A-A' of FIG. 2.
Figure 9:
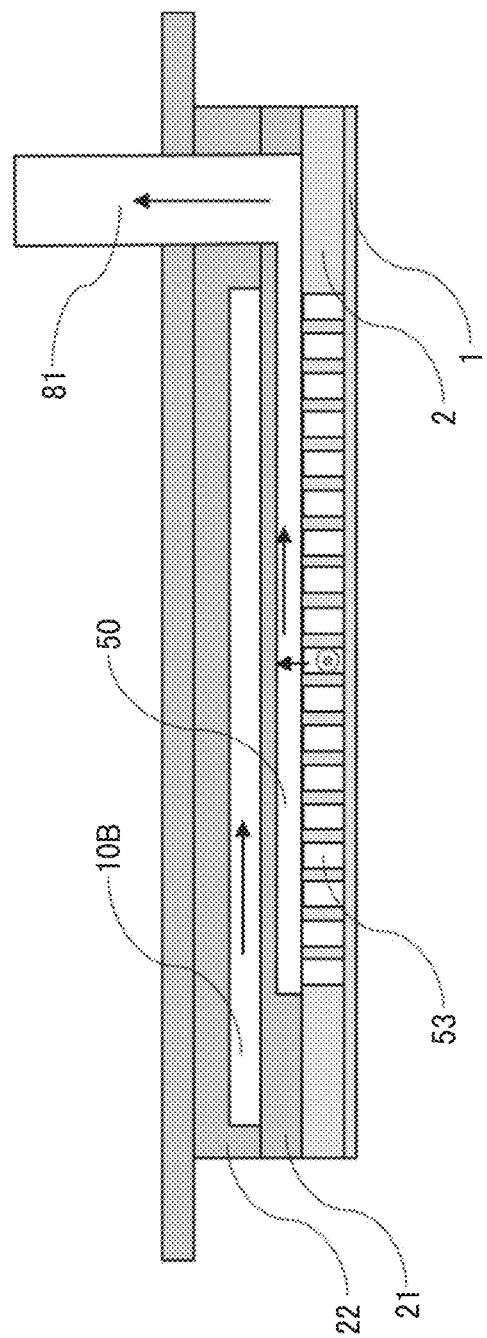
FIG. 9 is a cross-sectional view taken along a line B-B' of FIG. 2.

An example of the discharging head according to an embodiment of the present disclosure will be described with reference to FIGS. 1 to 12. FIG. 1 is an outer perspective view of the discharging head according to an embodiment of the present disclosure. FIG. 2 is a cross-sectional view of the discharging head according to an embodiment of the present disclosure, taken along a direction orthogonal to a nozzle array direction. FIG. 3 is a cross-sectional view of the discharging head according to an embodiment of the present disclosure, taken along a direction parallel with a nozzle array direction. FIG. 4 is a plan view of a nozzle plate of the discharging head according to an embodiment of the present disclosure. FIG. 5A to FIG. 5F are each a plan view of each member constituting a flow path member of the discharging head according to an embodiment of the present disclosure. FIG. 6A and FIG. 6B are each a plan view of each member constituting a common liquid chamber member of the discharging head according to an embodiment of the present disclosure. FIG. 7 is a block diagram illustrating an example of a circulation system of the present disclosure. FIG. 8 is a cross-sectional view taken along a line A-A' of FIG. 2. FIG. 9 is a cross-sectional view taken along a line B-B' of FIG. 2.

In the discharging head, a nozzle plate 1, a flow path plate 2, and a vibration plate member 3 serving as a wall surface member are laminated and joined to each other. The discharging head includes a piezoelectric actuator 11 configured to displace the vibration plate member 3, a common liquid chamber member 20, and a cover 29.

The nozzle plate 1 has a plurality of nozzles 4 through which liquid droplets of the liquid composition are discharged.

In the flow path plate 2, an individual liquid chamber 6 leading to the nozzle 4, a fluid resistor section 7 leading to the individual liquid chamber 6, and a liquid introducing section 8 leading to the fluid resistor section 7 are formed. In the flow path plate 2, a plurality of plate-shaped members 41 to 45 are laminated from the nozzle plate 1 side and joined to each other. These plate-shaped members 41 to 45 are laminated with and joined to the vibration plate member 3, to constitute a flow path member 40.

The vibration plate member 3 has a filter section 9 serving as an opening via which the liquid introducing section 8 and a common liquid chamber 10 formed by the common liquid chamber member 20 lead to each other.

The vibration plate member 3 is a wall surface member forming a wall surface of the individual liquid chamber 6 in the flow path plate 2. The vibration plate member 3 is a two-layered structure (non-limiting) including, from the flow path plate 2 side, a first layer forming a thin member and a second layer forming a thick member. The first layer has a deformable vibration region 30 at a portion corresponding to the individual liquid chamber 6.

In the nozzle plate 1, a plurality of nozzles 4 are arranged in a staggered state as illustrated in FIG. 4.

Figure 5A:
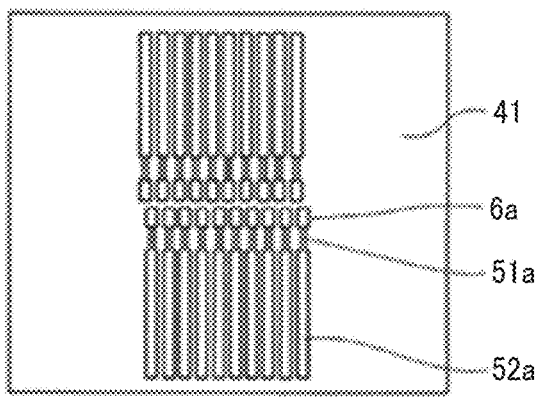
FIG. 5A is a plan view of each member constituting a flow path member of a discharging head of a liquid discharging apparatus of the present disclosure.

In the plate-shaped member 41 constituting the flow path plate 2, through-grooves (i.e., groove-shaped through-holes) 6a constituting the individual liquid chambers 6, and through-grooves 51a and 52a constituting fluid resistor sections 51 and circulation flow paths 52 are formed as illustrated in FIG. 5A.

Figure 5B:
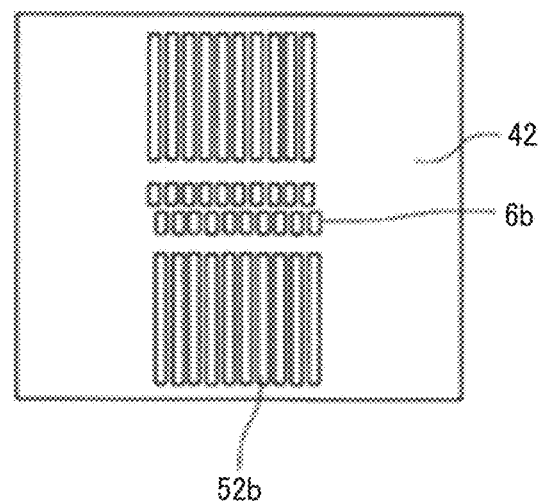
FIG. 5B is a plan view of each member constituting a flow path member of a discharging head of a liquid discharging apparatus of the present disclosure.

Likewise, in the plate-shaped member 42, through-grooves 6b constituting the individual liquid chambers 6, and through-grooves 52b constituting the circulation flow paths 52 are formed as illustrated in FIG. 5B.

Figure 5C:
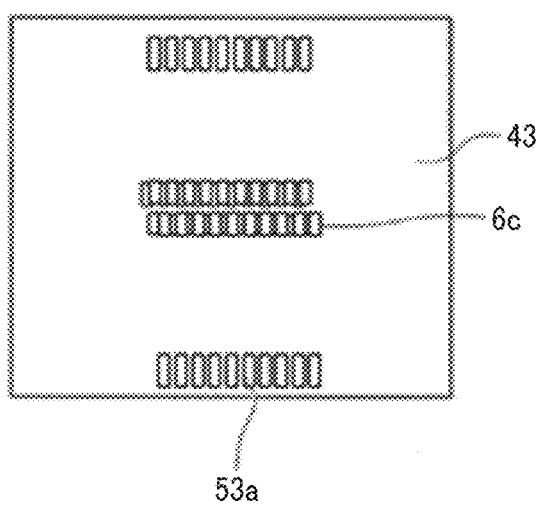
FIG. 5C is a plan view of each member constituting a flow path member of a discharging head of a liquid discharging apparatus of the present disclosure.

Likewise, in the plate-shaped member 43, through-grooves 6c constituting the individual liquid chambers 6, and through-grooves 53a constituting circulation flow paths 53 and having a longer dimension thereof in the nozzle array direction are formed as illustrated in FIG. 5C.

Figure 5D:
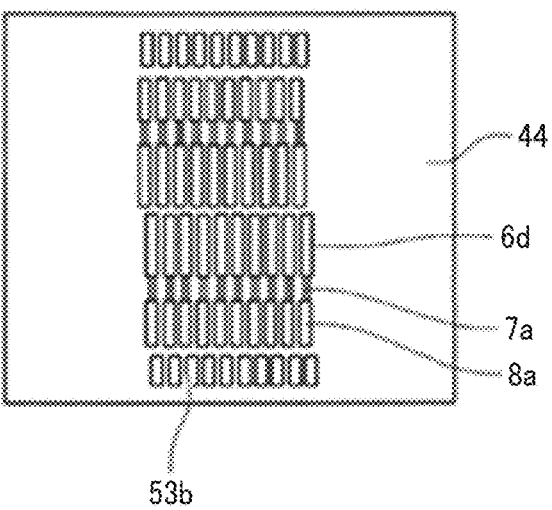
FIG. 5D is a plan view of each member constituting a flow path member of a discharging head of a liquid discharging apparatus of the present disclosure.

Likewise, in the plate-shaped member 44, through-grooves 6d constituting the individual liquid chambers 6, through-grooves 7a constituting the fluid resistor sections 7, through-grooves 8a constituting the liquid introducing sections 8, and through-grooves 53b constituting the circulation flow paths 53 and having a longer dimension thereof in the nozzle array direction are formed as illustrated in FIG. 5D.

Figure 5E:
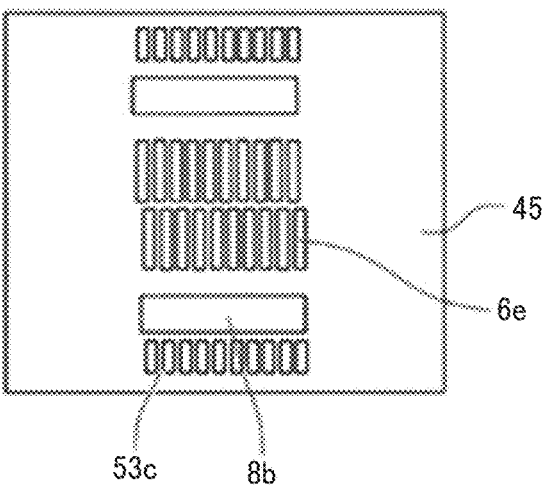
FIG. 5E is a plan view of each member constituting a flow path member of a discharging head of a liquid discharging apparatus of the present disclosure.

Likewise, in the plate-shaped member 45, through-grooves 6e constituting the individual liquid chambers 6, a through-groove 8b (serving as a liquid chamber downstream of a filter) constituting the liquid introducing sections 8 and having a longer dimension thereof in the nozzle array direction, and through-grooves 53c constituting the circulation flow paths 53 and having a longer dimension thereof in the nozzle array direction are formed as illustrated in FIG. 5E.

Figure 5F:
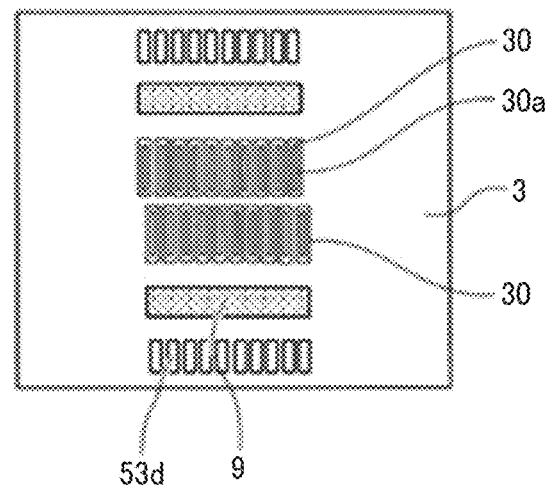
FIG. 5F is a plan view of each member constituting a flow path member of a discharging head of a liquid discharging apparatus of the present disclosure.

In the vibration plate member 3, vibration regions 30, a filter section 9, and through-grooves 53d constituting the circulation flow paths 53 and having a longer dimension thereof in the nozzle array direction are formed as illustrated in FIG. 5F.

By forming the flow path member by laminating and joining a plurality of plate-shaped members in this way, it is possible to form complicated flow paths with a simple configuration.

By this configuration, the fluid resistor sections 51 leading to the respective individual liquid chambers 6 and extending along the planar direction of the flow path plate 2, the circulation flow paths 52, and the circulation flow paths 53 leading to the circulation flow paths 52 and extending in the thickness direction of the flow path member 40 are formed in the flow path member 40 formed of the flow path plate 2 and the vibration plate member 3.

The circulation flow paths 53 lead to a common circulation liquid chamber 50 described below.

In the common liquid chamber member 20, the common liquid chamber 10 and a common circulation liquid chamber 50 into both of which the liquid composition is supplied from supply/circulation mechanisms are formed.

In a first common liquid chamber member 21 constituting the common liquid chamber member 20, a piezoelectric actuator through-groove 25a, a through-groove 10a constituting a downstream common liquid chamber 10A, and a bottomed groove 50a constituting the common circulation liquid chamber 50 are formed as illustrated in FIG. 6A.

Likewise, in a second common liquid chamber member 22, a piezoelectric actuator through-groove 25b, and a groove 10b constituting an upstream common liquid chamber 10B are formed as illustrated in FIG. 6B.

Also with reference to FIG. 1, in the second common liquid chamber member 22, a through-hole 71a serving as a supply inlet via which one end of the common liquid chamber 10 in the nozzle array direction and a supply port 71 lead to each other is formed.

Likewise, in the first common liquid chamber member 21 and the second common liquid chamber member 22, through-holes 81a and 81b via which the other end of the common circulation liquid chamber 50 in the nozzle array direction (the other end being an end opposite to the through-hole 71a) and a circulation port 81 lead to each other are formed.

In FIG. 6A and FIG. 6B, the bottomed grooves are illustrated by solid painting (the same applies in the following drawings).

In this way, the common liquid chamber member 20 is formed of the first common liquid chamber member 21 and the second common liquid chamber member 22. The first common liquid chamber member 21 is joined to the vibration plate member 3 side of the flow path member 40 and the second common liquid chamber member 22 is laminated over and joined to the first common liquid chamber member 21.

In the first common liquid chamber member 21, a downstream common liquid chamber 10A constituting a part of the common liquid chamber 10 and leading to the liquid introducing section 8, and the common circulation liquid chamber 50 leading to the circulation flow path 53 are formed. In the second common liquid chamber member 22, an upstream common liquid chamber 10B constituting a remaining part of the common liquid chamber 10 is formed.

The downstream common liquid chamber 10A constituting a part of the common liquid chamber 10 and the common circulation liquid chamber 50 are disposed side by side in the direction orthogonal to the nozzle array direction, and the common circulation liquid chamber 50 is disposed at a position at which it is projected within the common liquid chamber 10.

This makes it possible for the dimension of the common circulation liquid chamber 50 not to be constrained by the dimension needed for the flow paths including the individual liquid chambers 6, the fluid resistor sections 7, and the liquid introducing sections 8 formed in the flow path member 40.

With the common circulation liquid chamber 50 and a part of the common liquid chamber 10 disposed side by side and the common circulation liquid chamber 50 disposed at a position at which it is projected within the common liquid chamber 10, it is possible to save the width of the head in the direction orthogonal to the nozzle array direction and save the size of the head. In the common liquid chamber member 20, the common liquid chamber 10 into which the liquid composition is supplied from a head tank and a cartridge, and the common circulation liquid chamber 50 are formed.

The piezoelectric actuator 11 including an electromechanical transducer serving as a driving unit for deforming the vibration region 30 of the vibration plate member 3 is disposed on a surface of the vibration plate member 3 opposite to the individual liquid chamber 6.

As illustrated in FIG. 3, the piezoelectric actuator 11 has a piezoelectric member joined to a base member 13. The piezoelectric member is half-cut-diced and grooved in a manner that one piezoelectric member has a needed number of columnar piezoelectric elements 12A and 12B at predetermined intervals in a comb-teeth shape.

The piezoelectric element 12A is used as a piezoelectric element to be driven by application of a drive waveform, whereas the piezoelectric element 12B is used as a mere support to which no drive waveform is applied. However, all of the piezoelectric elements 12A and 12B may be used as piezoelectric elements to be driven.

The piezoelectric element 12A is joined to a protrusion 30a, which is an island-shaped thick portion formed on the vibration region 30 of the vibration plate member 3. The piezoelectric element 12B is joined to a protrusion 30b, which is a thick portion of the vibration plate member 3.

The piezoelectric member is formed as an alternate laminate of piezoelectric layers and internal electrodes. The internal electrodes are drawn out to end surfaces to serve as an external electrode. A flexible wire member 15 is connected to the external electrode.

In the discharging head having the configuration described above, for example, when the voltage applied to the piezoelectric element 12A is lowered from a reference voltage, the piezoelectric element 12A shrinks, the vibration region 30 of the vibration plate member 3 goes down, and the volume of the individual liquid chamber 6 expands. As a result, the liquid composition flows into the individual liquid chamber 6.

Subsequently, the voltage applied to the piezoelectric element 12A is raised to extend the piezoelectric element 12A in the lamination direction, deform the vibration region 30 of the vibration plate member 3 in the direction toward the nozzle 4, and shrink the volume of the individual liquid chamber 6. As a result, the liquid composition in the individual liquid chamber 6 is pressurized and discharged through the nozzle 4.

Then, by the surface tension of the liquid composition, the liquid composition is pulled out from the common liquid chamber 10 for replenishment of the liquid composition. Finally, the meniscus surface stabilizes depending on the balance among the supply tank and the circulation tank, a negative pressure defined by a hydraulic head differential, and the surface tension of the meniscus. This enables shift to the next discharging operation.

The head driving method is not limited to the example described above (pull-push driving). Depending on the method for applying a drive waveform, pull driving and push driving are available. In the embodiment described above, a laminated piezoelectric element is employed to describe a pressure generating unit configured to apply pressure fluctuation to the individual liquid chamber 6. However, this is non-limiting. A thin film-shaped piezoelectric element may be employed. Moreover, application of pressure fluctuation by generation of bubbles by heat generation of a heat resistor disposed in the individual liquid chamber 6, or generation of pressure fluctuation by an electrostatic force may be employed.

Next, an example of a liquid circulation system using the discharging head according to the present embodiment will be described with reference to FIG. 7.

FIG. 7 is a block diagram illustrating a liquid circulation system according to the present embodiment.

As illustrated in FIG. 7, the liquid circulation system includes, for example, a main tank, a discharging head, a supply tank, a circulation tank, a compressor (serving as a circulation speed control unit) 701, a vacuum pump, liquid sending pumps, regulators (R), a supply-side pressure sensor 702, and a circulation-side pressure sensor 703, and further includes a circulation speed control unit configured to adjust the liquid circulation speed in the overall system. The supply-side pressure sensor 702 is disposed between the supply tank and the discharging head and coupled to a supply flow path leading to the supply port 71 (see FIG. 1) of the discharging head. The circulation-side pressure sensor 703 is disposed between the discharging head and the circulation tank and coupled to a circulation flow path leading to the circulation port 81 (see FIG. 1) of the discharging head.

One side of the circulation tank is coupled to the supply tank via the first liquid sending pump, and the other side of the circulation tank is coupled to the main tank via the second liquid sending pump. Hence, the liquid composition flows into the discharging head from the supply tank through the supply port 71 and is let out into the circulation tank through the circulation port and sent from the circulation tank into the supply tank by the first liquid sending pump. In this way, the liquid composition is circulated.

The compressor 701 is coupled to the supply tank, and the supply tank is controlled in a manner that a predetermined positive pressure is sensed by the supply-side pressure sensor 702. On the other hand, a vacuum pump is coupled to the circulation tank, and the circulation tank is controlled in a manner that a predetermined negative pressure is sensed by the circulation-side pressure sensor 703. This makes it possible to circulate the liquid composition through the discharging head and keep the negative pressure of the meniscus constant.

When liquid droplets are discharged through the nozzles of the discharging head, the amounts of the liquid composition in the supply tank and the circulation tank decrease. Hence, it is preferable to replenish the circulation tank with the liquid composition from the main tank, appropriately using the second liquid sending pump from the main tank. The timing at which the circulation tank is replenished with the liquid composition from the main tank can be controlled based on a sensing result of, for example, a liquid surface sensor provided inside the circulation tank, in a manner that, for example, the circulation tank is replenished with the liquid composition when the liquid surface height of the liquid composition in the circulation tank falls below a predetermined height.

Next, circulation of the liquid composition through the discharging head will be descried. As illustrated in FIG. 1, the supply port 71 leading to the common liquid chamber and the circulation port 81 leading to the common circulation liquid chamber 50 are formed at ends of the common liquid chamber member 20. The supply port 71 and the circulation port 81 are coupled to the supply tank and the circulation tank (see FIG. 7) storing the liquid composition through tubes respectively. The liquid composition stored in the supply tank is supplied into the individual liquid chamber 6 through the supply port 71, the common liquid chamber 10, the liquid introducing section 8, and the fluid resistor section 7.

The liquid composition in the individual liquid chamber 6 is discharged through the nozzle 4 in response to driving of the piezoelectric element 12. On the other hand, the liquid composition remaining inside the individual liquid chamber 6 without being discharged is partially or wholly circulated into the circulation tank through the fluid resistor section 51, the circulation flow paths 52 and 53, the common circulation liquid chamber 50, and the circulation port 81.

It is possible to circulate the liquid composition not only during the operation of the discharging head but also during suspension of the operation. It is preferable to circulate the liquid composition during suspension of the operation because the liquid composition in the individual liquid chamber can be refreshed constantly and the components contained in the liquid composition can be suppressed from coagulation and settling.

When the liquid composition contains titanium oxide particles that tend to settle as in the present disclosure, the particles may settle or adhere in the circulation flow path if the circulation speed of the liquid composition is low. This increases the resistance in the circulation flow path, and the value to be detected by the supply-side pressure sensor 702 or the circulation-side pressure sensor 703 becomes low. In such a case, it is possible to overcome the settled matter by controlling the circulation speed of the liquid composition to be higher.

Specifically, when the value detected by the supply-side pressure sensor 702 or the circulation-side pressure sensor 703 falls to a previously set target lower limit value (for example, lower than the half of the pressure in the normal state), the flow rate is controlled in a manner that a detected pressure is increased to a target pressure (the pressure in the normal state) at a previously set pressure change rate. Until before a predetermined time passes from when a detected value has reached the target pressure, the increased flow rate is maintained. As a result, the settled matter can be overcome.

Figure 10:
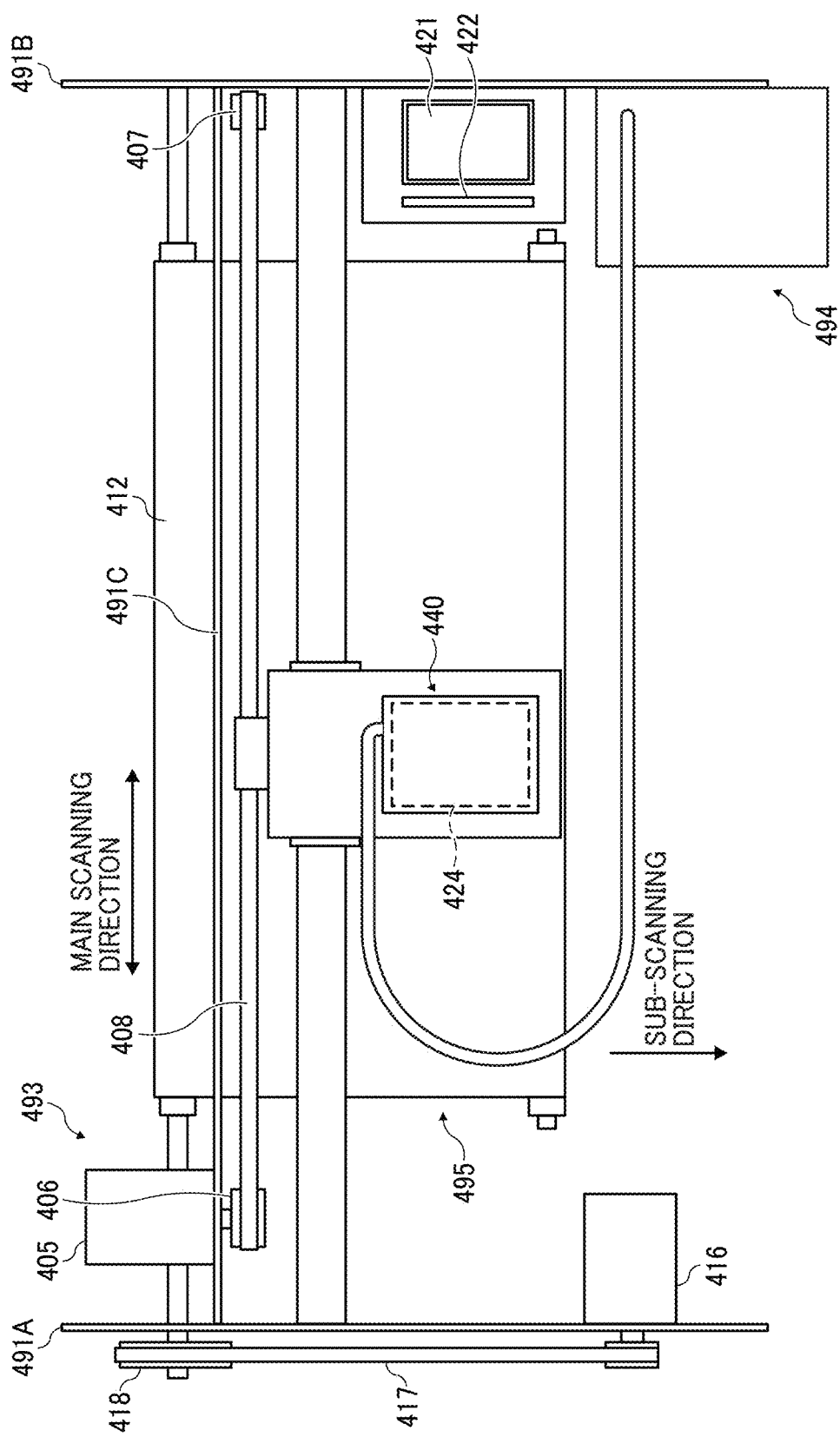
FIG. 10 is a plan view of main parts illustrating an example of a liquid discharging apparatus of the present disclosure.
Figure 11:
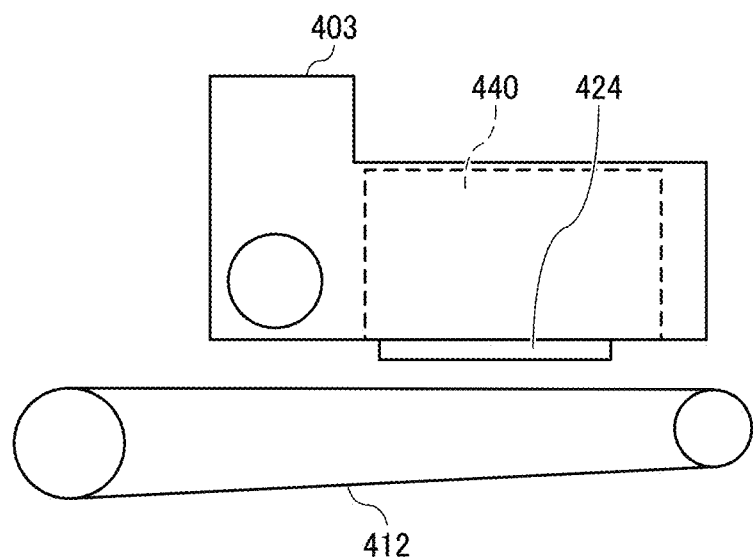
FIG. 11 is a side view of main parts illustrating an example of a liquid discharging apparatus of the present disclosure.

Next, an example of a liquid discharging apparatus of the present disclosure will be described with reference to FIG. 10 and FIG. 11. FIG. 10 is a plan view of main parts of the liquid discharging apparatus. FIG. 11 is a side view of main parts of the liquid discharging apparatus.

The liquid discharging apparatus is a serial-type apparatus, and a main scanning moving mechanism 493 reciprocably moves a carriage 403 in the main scanning direction. The main scanning moving mechanism 493 includes, for example, a guide member 401, a main scanning motor 405, and a timing belt 408. The guide member 401 is passed in a bridging manner between the left and right side panels 491A and 491B to hold the carriage 403 in a movable manner. The main scanning motor 405 reciprocably moves the carriage 403 in the main scanning direction via the timing belt 408 passed in a bridging manner between a driving pulley 406 and a driven pulley 407.

The carriage 403 is mounted with a liquid discharging unit 440 mounted with a discharging head 424 of the present disclosure. The discharging head 424 of the liquid discharging unit 440 is configured to discharge liquid compositions of, for example, yellow (Y), cyan (C), magenta (M), and black (K). The discharging head 424 is mounted in a manner that nozzle lines including a plurality of nozzles extend in the sub-scanning direction orthogonal to the main scanning direction and the discharging direction is downward.

A supply/circulation mechanism configured to supply the liquid composition stored in a container 494 into the discharging head 424 supplies and circulates the liquid composition into and through the discharging head 424. In the present example, the supply/circulation mechanism includes, for example, a supply tank, a circulation tank, a compressor 701, a vacuum pump, liquid sending pumps, and regulators (R). A supply-side pressure sensor 702 is disposed between the supply tank and the discharging head and coupled to a supply flow path leading to the supply port 71 of the discharging head. A circulation-side pressure sensor 703 is disposed between the discharging head the circulation tank and coupled to a circulation flow path leading to the circulation port 81 of the discharging head.

The apparatus includes a conveying mechanism 495 configured to convey a sheet 410. The conveying mechanism 495 includes a conveying belt 412 serving as a conveying unit, and a sub-scanning motor 416 configured to drive the conveying belt 412.

The conveying belt 412 attracts a sheet 410 and conveys the sheet 410 at a position counter to the discharging head 424. The conveying belt 412 is an endless belt, and passed between a conveying roller 413 and a tension roller 414. Attraction can be performed by, for example, electrosorption or air suction.

The conveying belt 412 rotates and moves in the sub-scanning direction along with the conveying roller 413 being driven to rotate by the sub-scanning motor 416 via a timing belt 417 and a timing pulley 418.

A maintenance/repair mechanism 420 configured to maintain and repair the discharging head 424 is disposed at one end in the main scanning direction of the carriage 403 in a manner to adjoin the conveying belt 412.

The maintenance/repair mechanism 420 includes, for example, a cap member 421 configured to cap the nozzle surface (a surface in which nozzles are formed) of the discharging head 424, and a wiper member 422 configured to wipe the nozzle surface.

The main scanning moving mechanism 493, the supply/circulation mechanism, the maintenance/repair mechanism 420, and the conveying mechanism 495 are attached on the housing including the side panels 491A and 491B and a back panel 491C.

In the apparatus having the configuration described above, a sheet 410 is fed and attracted to the conveying belt 412 and conveyed in the sub-scanning direction along with the rotation movement of the conveying belt 412.

Here, the discharging head 424 is driven in accordance with an image signal while the carriage 403 is moved in the main scanning direction. In this way, the liquid composition is discharged and an image is formed over the sheet 410 that is being stopped.

Because the apparatus includes the discharging head of the present disclosure, it can form high-quality images stably.

Figure 12:
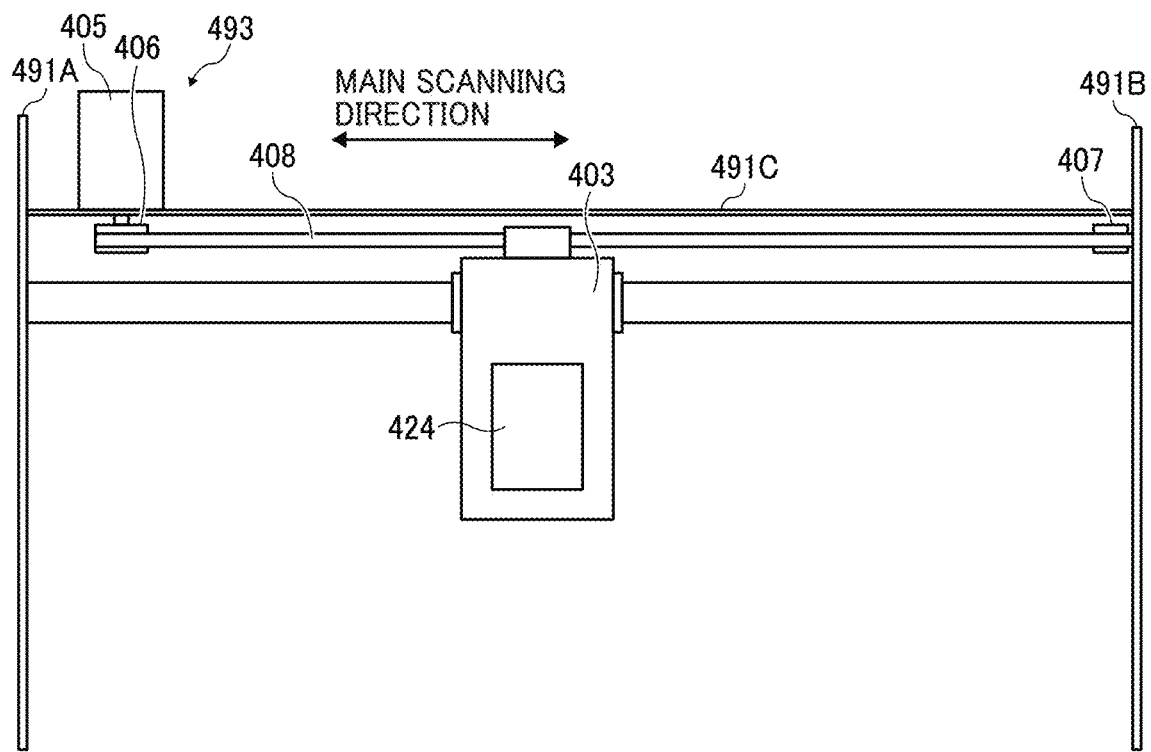
FIG. 12 is a plan view of main parts illustrating another example of a discharging unit of a liquid discharging apparatus of the present disclosure.

Next, another example of a liquid discharging unit of the present disclosure will be described with reference to FIG. 12. FIG. 12 is a plan view of main parts of the liquid discharging unit.

This liquid discharging unit is formed of: the housing part, which is formed of the side panels 419A and 491B and the back panel 491C; the main scanning moving mechanism 493; the carriage 403; and the discharging head 424 among the members that constitute the apparatus configured to discharging the liquid composition.

This liquid discharging unit may be configured as a liquid discharging unit further mounted with at least one of the maintenance/repair mechanism 420 and the supply/circulation mechanism described above on, for example, the side panel 491B.

In the present disclosure, a "discharging head" is a functional part configured to discharge the liquid composition through nozzles.

The liquid composition to be discharged needs at least to have a viscosity and a surface tension that enable the liquid composition to be discharged from the head and is not particularly limited. However, it is preferable that the viscosity of the liquid composition become 30 mPa·s or lower at normal temperature and normal pressure or by heating or cooling. More specifically, the liquid composition is, for example, a solution, a suspension, or an emulsion containing, for example, a solvent such as water and an organic solvent, a colorant such as a dye and a pigment, a function imparting material such as a polymerizable compound, a resin, and a surfactant, a biocompatible material such as DNA, amino acid, protein, and calcium, and an edible material such as a natural pigment. Such a liquid composition can be used for uses such as an inkjet ink and a surface processing fluid.

Examples of the energy generation source for discharging the liquid composition include, but are not limited to, a piezoelectric actuator (a laminated piezoelectric element and a thin film-shaped piezoelectric element), a thermal actuator employing an electrothermal transducer such as a heating resistor, and an electrostatic actuator formed of a vibration plate and a counter electrode.

A "liquid discharging unit" is an integrated body of a discharging head with functional parts and mechanisms, and is an assembly of parts involved in discharging of the liquid composition. Examples of the "liquid discharging unit" include, but are not limited to, a combination of the discharging head with at least one of the supply/circulation mechanism, the carriage, the maintenance/recovery mechanism, and the main scanning moving mechanism.

Integration means, for example, the discharging head, and the functional parts and mechanisms being secured to each other by, for example, fastening, bonding, and locking, and one of the discharging head, and the functional parts and mechanisms supported by the other in a movable manner. The discharging head, and the functional parts and mechanisms may be attachable and detachable from each other.

Examples of the liquid discharging unit include, but are not limited to, an integrated body of the discharging head with the supply/circulation mechanism, and an integrated body of the discharging head with the supply/circulation mechanism by mutual coupling through, for example, tubes. A unit including a filter may be added between the supply/circulation mechanism and the discharging head of such a liquid discharging unit.

Examples of the liquid discharging unit include, but are not limited to, an integrated body of the discharging head with the carriage.

Examples of the liquid discharging unit include, but are not limited to, an integrated body of the discharging head with a scanning moving mechanism, realized by the discharging head being supported movably on a guide member constituting a part of the scanning moving mechanism.

Examples of the liquid discharging unit include, but are not limited to, an integrated body of the discharging head with the carriage and the maintenance/repair mechanism, realized by the cap member constituting a part of the maintenance/repair mechanism being secured to the carriage mounted with the discharging head.

Examples of the liquid discharging unit include, but are not limited to, an integrated body of the discharging head with the supply mechanism, realized by a tube being coupled to the supply/circulation mechanism or to the discharging head including flow path members. The liquid composition in a liquid storage is supplied into the discharging head through this tube.

Examples of the main scanning moving mechanism include, but are not limited to, a guide member alone. Examples of the supply mechanism include, but are not limited to, a tube alone and a part to be mounted alone.

In the present disclosure, a "liquid discharging apparatus" is an apparatus including a discharging head or a liquid discharging unit and configured to drive the discharging head to discharge a liquid composition. Examples of an apparatus configured to discharge a liquid composition include, but are not limited to, an apparatus that can discharge a liquid composition to an article to which the liquid composition can attach, and an apparatus configured to discharge a liquid composition into the air or into a liquid.

The "liquid discharging apparatus" may further optionally include a device relating to feeding, conveying, and ejecting the article to which the liquid composition can attach and other devices referred to as a pre-processing device, a post-processing device, etc.

Examples of the "liquid discharging apparatus" include, but are not limited to, an image forming apparatus serving as an apparatus configured to discharge a liquid composition and form an image over a sheet, and a three-dimensional object producing apparatus (stereoscopic object producing apparatus) configured to discharge an object producing liquid to a power layer formed of a powder placed in a layer state to produce a three-dimensional object (stereoscopic object).

The "liquid discharging apparatus" is not limited to those producing merely meaningful visible images such as texts and figures with liquid droplets discharged. For example, the liquid discharging apparatus can produce, for example, meaningless patterns and 3D images.

The "article to which the liquid composition can attach" means an article to which the liquid composition can attach at least temporarily, and to which the liquid composition attaches and adheres or attaches and permeates. Specific examples of the article to which the liquid composition can attach include, but are not limited to, recording media such as sheets of paper, recording sheets, recording sheets of paper, films, cloth, and wallpaper, electronic parts such as electronic substrates and piezoelectric elements, and media such as powder layers, organ models, and testing cells, and unless otherwise particularly specified, include all articles to which the liquid composition attaches.

The material of the "article to which the liquid composition can attach" needs at least to have a property that the liquid composition can attach at least temporarily, such as paper, yarn, fiber, fabric, leather, metals, plastics, glass, wood, and ceramics.

The "liquid composition" needs at least to have a viscosity and a surface tension that enable the liquid composition to be discharged from a discharging head and is not particularly limited. However, it is preferable that the viscosity of the liquid composition become 30 mPa-s or lower at normal temperature and normal pressure or by heating or cooling. More specifically, the liquid composition is, for example, a solution, a suspension, or an emulsion containing, for example, a solvent such as water and an organic solvent, a colorant such as a dye and a pigment, a function imparting material such as a polymerizable compound, a resin, and a surfactant, a biocompatible material such as DNA, amino acid, protein, and calcium, and an edible material such as a natural pigment. Such a liquid composition can be used for uses such as an inkjet ink, a surface processing fluid, a liquid for forming a resist pattern for components of electronic elements and light-emitting elements and electronic circuits, and a material liquid for producing a three-dimensional object.

The "liquid discharging apparatus" is an apparatus in which the discharging head and the article to which the liquid composition can attach relatively move. However, the liquid discharging apparatus is not limited to such an apparatus. Specific examples of the liquid discharging apparatus include, but are not limited to, a serial-type apparatus configured to move a discharging head, and a line-type apparatus that does not move a discharging head.

Other examples of the "liquid discharging apparatus" include, but are not limited to, a processing fluid coating apparatus configured to discharge a processing fluid to a sheet of paper in order to apply the processing fluid to the surface of the sheet of paper for, for example, reformation of the surface of the sheet of paper, and a jet granulator configured to discharge through nozzles, a composition liquid obtained by dispersing materials in a solution, to granulate particles of the materials.

The terms used in the present disclosure such as image formation, recording, printing, and object production represent the same meaning.

EXAMPLES

The present disclosure will be described below by way of Examples. The present disclosure should not be construed as being limited to these Examples.

(Pigment Dispersion Production Example 1)
<Production of Cyan Pigment Dispersion>

A cyan pigment dispersion was obtained in the same manner as the method described in JP-2012-207202-A, under a section heading [Pigment surface reforming treatment], -Method A-.

Specifically, C.I. pigment blue 15:3 (product name: CHROMOFINE BLUE, obtained from Dainichiseika Color & Chemicals Mfg. Co., Ltd.) (20 g), a compound represented by Structural formula (A) below (20 mmol), and ion-exchanged water (200 mL) were mixed at room temperature using a SILVERSON mixer (6,000 rpm (0.6% by mass)), to obtain a slurry. When the pH of the obtained slurry was higher than 4, nitric acid (20 mmol) was added to the slurry. Thirty minutes later, sodium nitrite (20 mmol) dissolved in a small amount of ion-exchanged water was slowly added to the slurry. The resultant was heated to 60 degrees C. while being stirred, to be allowed to undergo a reaction for 1 hour. A reformed pigment, which was the C.I. pigment blue 15:3 having the compound represented by Structural formula (A) added to the surface was obtained.

Next, the reformed pigment was adjusted to pH of 10 with a NaOH aqueous solution, to obtain a reformed pigment dispersion thirty minutes later. The reformed pigment dispersion and ion-exchanged water were subjected to ultrafiltration through a dialysis membrane, and further subjected to ultrasonic dispersion treatment, to obtain a cyan pigment dispersion (self-dispersible type) having a pigment concentration of 15% by mass and containing a bisphosphonic acid group as a hydrophilic functional group.

[Structural formula (A)]

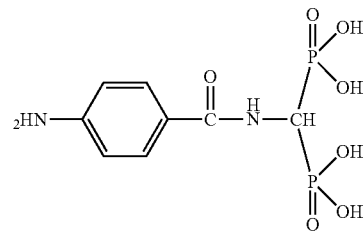

(Pigment Dispersion Production Example 2)
<Production of Magenta Pigment Dispersion>

A magenta pigment dispersion having a pigment concentration of 15% by mass was produced in the same manner as in Pigment dispersion production example 1, except that unlike in Pigment dispersion production example 1, C.I. pigment blue 15:3 (20 g) was changed to C.I. pigment red 122 (product name: TONER MAGENTA EO02, obtained from Clariant Japan K.K.) (20 g).

(Pigment Dispersion Production Example 3)
<Production of Yellow Pigment Dispersion>

A yellow pigment dispersion having a pigment concentration of 15% by mass was produced in the same manner as in Pigment dispersion production example 1, except that unlike in Pigment dispersion production example 1, C.I. pigment blue 15:3 (20 g) was changed to C.I. pigment yellow 74 (product name: FAST YELLOW 531, obtained from Dainichiseika Color & Chemicals Mfg. Co., Ltd.) (20 g).

(Pigment Dispersion Production Example 4)
<Production of Black Pigment Dispersion>

A black pigment dispersion having a pigment concentration of 15% by mass was produced in the same manner as in Pigment dispersion production example 1, except that unlike in Pigment dispersion production example 1, C.I. pigment blue 15:3 (20 g) was changed to carbon black (NIPEX 160, obtained from Degussa AG) (20 g).

(Resin Particle Production Example 1)
<Production of Polycarbonate-Based Urethane Resin Particle Liquid>

A reaction container into which a stirrer, a reflux condenser, and a thermometer were inserted was charged with polycarbonate diol (a reaction product of 1,6-hexanediol and dimethyl carbonate (with a number average molecular weight (Mn) of 1,200)) (1,500 g), 2,2-dimethylolpropionic acid (hereinafter may be referred to as "DMPA") (220 g), and N-methyl pyrrolidone (hereinafter may be referred to as "NMP") (1,347 g) under a nitrogen stream. The materials were heated to 60 degrees C. to dissolve DMPA.

Next, 4,4'-dicyclohexylmethane diisocyanate (1,445 g) and dibutyltin dilaurate (catalyst) (2.6 g) were added to the resultant, and the resultant was heated to 90 degrees C. to be allowed to undergo a urethanization reaction for 5 hours, to obtain an isocyanate-terminated urethane prepolymer. The reaction mixture was cooled to 80 degrees C. and triethylamine (149 g) was added and mixed with the resultant. From the resultant, 4,340 grams was extracted and added to a mixture solution of water (5,400 g) and triethylamine (15 g) under strong stirring.

Next, to the resultant, ice (1,500 g) was added, and a 35% by mass 2-methyl-1,5-pentanediamine aqueous solution (626 g) was added, to allow the resultant to undergo a chain elongation reaction. The solvent was evaporated from the resultant to adjust the solid concentration to 40% by mass, to obtain a polycarbonate urethane resin particle liquid.

<Measurement of Glass Transition Temperature>

Next, for the polycarbonate urethane resin particle liquid obtained, the glass transition temperature (Tg) of the polyurethane resin was measured with a differential scanning calorimeter (TA-60WS and DSC-60, obtained from Shimadzu Corporation).

First, a resin emulsion (4 g) was poured in a uniformly spreading manner into a petri dish having a diameter of 50 mm and formed of a tetrafluoroethylene/perfluoroalkyl vinyl ether copolymer (PFA) and dried at 50 degrees C. for 1 week. Subsequently, 5.0 milligrams out of the obtained resin film was added into a sample container formed of aluminum, and the sample container was put on a holder unit and set in an electric furnace. Next, under a nitrogen atmosphere, the sample was subjected to temperature elevation from 0 degrees C. to 150 degrees C. at a temperature elevation rate of 10 degrees C./min, then subjected to temperature reduction from 150 degrees C. to −80 degrees C. at a temperature reduction rate of 5 degrees C./min, and then further subjected to temperature elevation to 150 degrees C. at a temperature elevation rate of 10 degrees C./min, to measure a DSC curve. Based on the obtained DSC curved, Tg was analyzed according to a mid-point method from an inflection point during the second temperature elevation, using an analyzing program of the DSC-60 system. As a result. Tg was −20 degrees C.

(Resin Particle Production Example 2)

A polycarbonate urethane resin particle liquid 2 having a solid concentration of 40% by mass was obtained in the same manner as in Resin particle production example 1, except that unlike in Resin particle production example 1, polycarbonate diol (a reaction product of 1,6-hexanediol and dimethyl carbonate (with a number average molecular weight (Mn) of 1,200)) was changed to polycarbonate diol (a reaction product of 1,6-hexanediol and dimethyl carbonate (with a number average molecular weight (Mn) of 1,600)).

Tg of the obtained polycarbonate urethane resin particle liquid 2 measured in the same manner as in Resin particle liquid production example 1 was −30 degrees C.

(Resin Particle Production Example 3)

A polycarbonate urethane resin particle liquid 3 having a solid concentration of 40% by mass was obtained in the same manner as in Resin particle production example 1, except that unlike in Resin particle production example 1, polycarbonate diol (a reaction product of 1,6-hexanediol and dimethyl carbonate (with a number average molecular weight (Mn) of 1,200)) was changed to polycarbonate diol (a reaction product of 1,6-hexanediol and dimethyl carbonate (with a number average molecular weight (Mn) of 500)).

Tg of the obtained polycarbonate urethane resin particle liquid 3 measured in the same manner as in Resin particle liquid production example 1 was −10 degrees C.

(Resin Particle Production Example 4)

<Preparation of Polyester Urethane Resin Particle Liquid>

A polyester urethane resin particle liquid having a solid concentration of 30% by mass was obtained in the same manner as in Resin particle production example 1, except that unlike in Resin particle production example 1, polycarbonate diol (a reaction product of 1,6-hexanediol and dimethyl carbonate (with a number average molecular weight (Mn) of 1,200)) was changed to polyester polyol ("POLYLITE OD-X-2251", obtained from DIC Corporation, with a weight average molecular weight of 2,000).

The glass transition temperature (Tg) of the resin of the obtained polyester urethane resin particle liquid measured in the same manner as in Resin particle production example 1 was 57 degrees C.

(Resin Particle Production Example 5)

A polyester urethane resin particle liquid 5 having a solid concentration of 30% by mass was obtained in the same manner as in Resin particle production example 4, except that unlike in Resin particle production example 4, polyester polyol ("POLYLITE OD-X-2251", obtained from DIC Corporation, with a weight average molecular weight of 2,000) was changed to polyester polyol ("POLYLITE OD-X-2420", obtained from DIC Corporation, with a weight average molecular weight of 2,000).

The glass transition temperature (Tg) of the resin of the obtained polyester urethane resin particle liquid 5 measured in the same manner as in Resin particle production example 1 was 60 degrees C.

(Resin Particle Preparation Example 6)

A polyester urethane resin particle liquid 6 having a solid concentration of 30% by mass was obtained in the same manner as in Resin particle production example 4, except that unlike in Resin particle production example 4, polyester polyol ("POLYLITE OD-X-2251", obtained from DIC Corporation, with a weight average molecular weight of 2,000) was changed to polyester polyol ("POLYLITE OD-X-2722", obtained from DIC Corporation, with a weight average molecular weight of 2,000).

The glass transition temperature (Tg) of the resin of the obtained polyester urethane resin particle liquid 6 measured in the same manner as in Resin particle production example 1 was 50 degrees C.

(Ink Production Example 1)

<Production of Ink 1>

The black pigment dispersion (with a pigment solid concentration of 15% by mass) (15.0% by mass), the polycarbonate urethane resin particle liquid of Resin particle production example 1 (with a solid concentration of 40% by mass) (12.0% by mass), the polyester urethane resin particle liquid of Resin particle production example 2 (with a solid concentration of 30% by mass) (8.0% by mass), 1,2-propanediol (obtained from Tokyo Chemical Industry Co., Ltd.) (20.0% by mass), 3-methoxy-3-methyl-1-butanol (obtained from Kuraray Co., Ltd.) (10.0% by mass), 2,3-butanediol (obtained from Tokyo Chemical Industry Co., Ltd.) (5.0% by mass), 2-ethylhexyl alcohol (obtained from Tokyo Chemical Industry Co., Ltd.) (3.0% by mass), a polyether-modified surfactant (product name: WET 270, obtained from TEGO) (1.0% by mass), product name: PROXEL LV (obtained from Arch Chemicals Japan, Inc.) (0.1% by mass) serving as a preservative, and highly pure water (25.9% by mass) were added together, mixed, and stirred, and filtrated through a polypropylene filter having an average pore diameter of 1.0 micrometer, to obtain an ink 1.

(Ink Production Examples 2 to 12 and Comparative Ink Production Examples 1 to 4)

<Production of Inks 2 to 16>

Inks 2 to 16 were obtained in the same manner as in Ink production example 10 except that unlike in Ink production example 1, the materials and contents were changed to as presented in Table 1 to Table 3. The polyesterresin particle liquid used in Comparative ink production example 4 (ink 16) was KT0507 (with Tg of −25 degrees C., obtained from Unitika Ltd.).

TABLE 1

| | | Ink production example | | | | | |
|---|---|---|---|---|---|---|---|
| | | 1 | 2 | 3 | 4 | 5 | 6 |
| | Ink No. | 1 | 2 | 3 | 4 | 5 | 6 |
| Organic solvent | 1,2-Propanediol | 20.0 | 10.0 | 20.0 | 20.0 | 20.0 | 20.0 |
| | 3-Methoxy-3-methyl-1-butanol | 10.0 | 10.0 | 10.0 | 10.0 | 10.0 | 10.0 |
| | 2,3-Butanediol | 5.0 | 5.0 | 5.0 | 5.0 | 5.0 | 5.0 |
| | 2-Ethylhexyl alcohol | 3.0 | 3.0 | 3.0 | 3.0 | 3.0 | 3.0 |
| Surfactant | WET-270 | 1.0 | 1.0 | 1.0 | 1.0 | 1.0 | 1.0 |
| Preservative | PROXEL LV | 0.1 | 0.1 | 0.1 | 0.1 | 0.1 | 0.1 |
| Water | Highly pure water | 25.9 | 5.9 | 25.9 | 25.9 | 25.9 | 25.9 |
| Resin | Polycarbonate polyurethane resin particle liquid (Tg: −20° C.) | 12.0 | 30.0 | | | 12.0 | 12.0 |
| | Polycarbonate polyurethane resin particle liquid (Tg: −30° C.) | | | 12.0 | | | |
| | Polycarbonate polyurethane resin particle liquid (Tg: −10° C.) | | | | 12.0 | | |
| | Polyester polyurethane resin particle liquid (Tg: 57° C.) | 8.0 | 20.0 | 8.0 | 8.0 | | |
| | Polyester polyurethane resin particle liquid (Tg: 60° C.) | | | | | 8.0 | |
| | Polyester polyurethane resin particle liquid (Tg: 50° C.) | | | | | | 8.0 |
| | Polyester resin particle liquid (KT-0507, obtained from Unitika Ltd., Tg: −25° C.) | | | | | | |
| Pigment dispersion | Black dispersion | 15.0 | 15.0 | 15.0 | 15.0 | 15.0 | 15.0 |
| | Cyan dispersion | | | | | | |
| | Magenta dispersion | | | | | | |
| | Yellow dispersion | | | | | | |
| | Total (% by mass) | 100.0 | 100.0 | 100.0 | 100.0 | 100.0 | 100.0 |
| Resin solid concentration | Polycarbonate polyurethane resits particles | 4.8 | 12.0 | 4.8 | 4.8 | 4.8 | 4.8 |
| | Polyester polyurethane resin particles | 2.4 | 6.0 | 2.4 | 2.4 | 2.4 | 2.4 |
| | Total (% by mass) | 7.2 | 18.0 | 7.2 | 7.2 | 7.2 | 7.2 |

TABLE 2

| | | Ink production example | | | | | |
|---|---|---|---|---|---|---|---|
| | | 7 | 8 | 9 | 10 | 11 | 12 |
| | Ink No. | 7 | 8 | 9 | 10 | 11 | 12 |
| Organic solvent | 1,2-Propanediol | 20.0 | 20.0 | 20.0 | 20.0 | 20.0 | 10.0 |
| | 3-Methoxy-3-methyl-1-butanol | 10.0 | 10.0 | 10.0 | 10.0 | 10.0 | 10.0 |
| | 2,3-Butanediol | 5.0 | 5.0 | 5.0 | 5.0 | 5.0 | 5.0 |
| | 2-Ethylhexyl alcohol | 3.0 | 3.0 | 3.0 | 3.0 | 3.0 | 3.0 |
| Surfactant | WET-270 | 1.0 | 1.0 | 1.0 | 1.0 | 1.0 | 1.0 |
| Preservative | PROXEL LV | 0.1 | 0.1 | 0.1 | 0.1 | 0.1 | 0.1 |
| Water | Highly pure water | 25.9 | 25.9 | 25.9 | 27.9 | 21.9 | 2.2 |
| Resin | Polycarbonate polyurethane resin particle liquid (Tg: −20° C.) | 12.0 | 12.0 | 12.0 | 18.0 | | 38.7 |
| | Polycarbonate polyurethane resin particle liquid (Tg: −30° C.) | | | | | | |
| | Polycarbonate polyurethane resin particle liquid (Tg: −10° C.) | | | | | | |
| | Polyester polyurethane resin particle liquid (Tg: 57° C.) | 8.0 | 8.0 | 8.0 | | 24.0 | 15.0 |
| | Polyester polyurethane resin particle liquid (Tg: 60° C.) | | | | | | |
| | Polyester polyurethane resin particle liquid (Tg: 50° C.) | | | | | | |
| | Polyester resin particle liquid (KT-0507, obtained from Unitika Ltd., Tg: −25° C.) | | | | | | |
| Pigment dispersion | Black dispersion | | | | 15.0 | 15.0 | 15.0 |
| | Cyan dispersion | 15.0 | | | | | |
| | Magenta dispersion | | 15.0 | | | | |
| | Yellow dispersion | | | 15.0 | | | |
| | Total (% by mass) | 100.0 | 100.0 | 100.0 | 100.0 | 100.0 | 100.0 |
| Resin solid concentration | Polycarbonate polyurethane resin particles | 4.8 | 4.8 | 4.8 | 7.2 | 0.0 | 15.5 |
| | Polyester polyurethane resin particles | 2.4 | 2.4 | 2.4 | 0.0 | 7.2 | 4.5 |
| | Total (% by mass) | 7.2 | 7.2 | 7.2 | 7.2 | 7.2 | 20.0 |

TABLE 3

|  |  | Comparative ink production example | | | |
|---|---|---|---|---|---|
|  |  | 1 | 2 | 3 | 4 |
|  | Ink No. | 13 | 1 | 15 | 16 |
| Organic solvent | 1,2-Propanediol | 20.0 | 9.0 | 10.0 | 10.0 |
|  | 3-Methoxy-3-methyl-1-butanol | 10.0 | 9.0 | 10.0 | 10.0 |
|  | 2,3-Butanediol | 5.0 | 4.0 | 5.0 | 5.0 |
|  | 2-Ethylhexyl alcohol | 3.0 | 2.0 | 3.0 | 3.0 |
| Surfactant | WET-270 | 1.0 | 1.0 | 1.0 | 1.0 |
| Preservative | PROXEL LV | 0.1 | 0.1 | 0.1 | 0.1 |
| Water | Highly pure water | 25.9 | 2.9 | 39.4 | 27.1 |
| Resin | Polycarbonate polyurethane resin particle liquid (Tg: −20° C.) | 12.0 | 34.0 | 10.0 |  |
|  | Polycarbonate polyurethane resin particle liquid (Tg: −30° C.) |  |  |  |  |
|  | Polycarbonate polyurethane resin particle liquid (Tg: −10° C.) |  |  |  |  |
|  | Polyester polyurethane resin particle liquid (Tg: 57° C.) | 8.0 | 23.0 | 6.5 |  |
|  | Polyester polyurethane resin particle liquid (Tg: 60° C.) |  |  |  |  |
|  | Polyester polyurethane resin particle liquid (Tg: 50° C.) |  |  |  |  |
|  | Polyester resin particle liquid (KT-0507, obtained from Unitika Ltd., Tg: −25° C.) |  |  |  | 28.8 |
| Pigment dispersion | Black dispersion | 15.0 | 15.0 | 15.0 | 15.0 |
|  | Cyan dispersion |  |  |  |  |
|  | Magenta dispersion |  |  |  |  |
|  | Yellow dispersion |  |  |  |  |
|  | Total (% by mass) | 100.0 | 100.0 | 100.0 | 100.0 |
| Resin solid concentration | Polycarbonate polyurethane resin particles | 4.8 | 13.6 | 4.0 | 7.2 |
|  | Polyester polyurethane resin particles | 2.4 | 6.9 | 2.0 | 0.0 |
|  | Total (% by mass) | 7.2 | 20.5 | 6.0 | 7.2 |

(Examples 1 to 12 and Comparative Examples 1 to 4)
<Image Formation>

Next, using the obtained inks 1 to 12 and inks 14 to 16 in an inkjet discharging apparatus illustrated in FIG. 10 including a discharging head having the circulation mechanism illustrated in FIG. 1 to FIG. 9, solid images were printed over PE wallpaper media (SUNLIGHT 110, obtained from TAYA). After printing, the solid images were dried on a hot plate (NINOS ND-1, obtained from As One Corporation) set to 100 degrees C. for 1 hour.

The ink 13 used in Comparative Example 1 was used in an ink-jet discharging apparatus mounted with a GEN5 head (obtained from Ricoh Printing Systems, Ltd.) (Without a circulation mechanism), to print a solid image over PE wallpaper media (SUNLIGHT 110, obtained from TAYA). After printing, the solid image was dried on a hot plate set to 100 degrees C. for 1 hour.

Next, "discharging reliability", "non-transferability", and "scratch resistance" were evaluated in the manners described below. The results are presented in Tables 4 to 6.
<Discharging Reliability>

Discharging reliability of the inks 1 to 12 and the inks 14 to 16 were evaluated using an inkjet discharging apparatus illustrated in FIG. 10 including a discharging head having the circulation mechanism illustrated in FIG. 1 to FIG. 9. Discharging reliability of the ink 13 was evaluated using an inkjet discharging apparatus mounted with a GEN5 head (obtained from Ricoh Printing Systems, Ltd.) (without a circulation mechanism).

Using the inkjet discharging apparatus filled with each ink obtained, a nozzle check pattern was printed to confirm that no "nozzle discharging failure" occurred. Subsequently, the inkjet printer was left to stand for 12 hours. After the inkjet printer was left to stand for 12 hours, a nozzle check pattern was printed without a cleaning maintenance, to count "nozzle discharging failure" that would occur and evaluate "discharging reliability" according to the evaluation criteria described below. In this evaluation, the rating A is desirable for practical use. "Nozzle discharging failure" means that the ink was not discharged and an ink image was not depicted correctly.
[Evaluation Criteria]

A: Nozzle discharging failure occurred at two positions or less.

B: Nozzle discharging failure occurred at three positions or more but four positions or less.

C: Nozzle discharging failure occurred at five positions or more.
<Non-Transferability>

Two solid images generated in each Example or Comparative Example were cut into a size of 3 cm×3 cm, and the two solid images were overlaid in a manner that the solid images would contact each other. A pressure of 1.0 MPa was applied to the overlaid images from above for 10 seconds using a press machine. Subsequently, the two evaluation samples were peeled from each other to confirm how easily they were peeled and visually observe presence or absence of any damage in the images after peeled, and evaluate "non-transferability" according to the evaluation criteria described below. In this evaluation, the rating A is desirable for practical use.
[Evaluation Criteria]

A: When the two solid images were peeled, they were peeled naturally without stickiness, and no color transfer to each other's base material was observed.

B: When the two solid images were peeled, there was a slight stickiness, but no damage was observed in the images.

C: When the two solid images were peeled, there was stickiness, and slight damage was observed in the images.

<Scratch Resistance>

Under a load of 200 g, each solid image generated was scratched 25 times with dry cotton (shirting No. 3), to visually observe the conditions of the image and evaluate "scratch resistance" according to the evaluation criteria described below. In this evaluation, the ratings B and A are desirable for practical use.

[Evaluation Criteria]

A: The image did not change.

B: Slight scars were left in the image but were not influential to the image density.

C: The image density degraded.

TABLE 4

|  |  | Ex. | | | | | |
| --- | --- | --- | --- | --- | --- | --- | --- |
|  |  | 1 | 2 | 3 | 4 | 5 | 6 |
| Discharging head | Ink No. | 1 | 2 | 3 | 4 | 5 | 6 |
|  | Presence/absence of circulation mechanism | Present | Present | Present | Present | Present | Present |
| Evaluation result | Scratch resistance | A | A | A | A | A | A |
|  | Discharging reliability | A | A | A | A | A | A |
|  | Non-transferability | A | A | A | A | A | A |

TABLE 5

|  |  | Ex. | | | | | |
| --- | --- | --- | --- | --- | --- | --- | --- |
|  |  | 7 | 8 | 9 | 10 | 11 | 12 |
| Discharging head | Ink No. | 7 | 8 | 9 | 10 | 11 | 12 |
|  | Presence/absence of circulation mechanism | Present | Present | Present | Present | Present | Present |
| Evaluation result | Scratch resistance | A | A | A | A | A | A |
|  | Discharging reliability | A | A | A | A | A | A |
|  | Non-transferability | A | A | A | A | A | A |

TABLE 6

|  |  | Comp. Ex. | | | |
| --- | --- | --- | --- | --- | --- |
|  |  | 1 | 2 | 3 | 4 |
| Discharging head | Ink No. | 13 | 14 | 15 | 16 |
|  | Presence/absence of circulation mechanism | Absent | Present | Present | Present |
| Evaluation result | Scratch resistance | A | B | C | C |
|  | Discharging reliability | C | C | A | A |
|  | Non-transferability | A | A | C | C |

Aspects and embodiments of the present disclosure are, for example, as follows.

<1> A liquid discharging apparatus including:

a container containing a liquid composition containing water, an organic solvent, and a polyurethane resin; and a discharging head including:

an individual liquid chamber including a circulation flow path through which the liquid composition circulates; and a nozzle through which a liquid droplet of the liquid composition is discharged, the nozzle communicating with the individual liquid chamber, wherein a solid content of the polyurethane resin in the liquid composition is 7% by mass or greater but 20.0% by mass or less.

<2> The liquid discharging apparatus according to <1>, wherein the polyurethane resin comprises at least one selected from the group consisting of polycarbonate polyurethane resins and polyester polyurethane resins.

<3> The liquid discharging apparatus according to <2>, wherein a glass transition temperature of the polycarbonate polyurethane resins is −10 degrees C. or lower but −30 degrees C. or higher, and a glass transition temperature of the polyester polyurethane resins is 50 degrees C. or higher but 60 degrees C. or lower.

<4> The liquid discharging apparatus according to any one of <1> to <3>, wherein the discharging head further includes:

a pressure sensor configured to detect a pressure of the liquid composition; and a circulation speed control unit configured to control a circulation speed of the liquid composition to adjust the pressure of the liquid composition to a target pressure.

<5> The liquid discharging apparatus according to <4>, wherein the circulation speed control unit controls the circulation speed of the liquid composition to be higher when a detected value of the pressure sensor is lower than the target pressure.

<6> An inkjet printing apparatus including:

a container containing an ink containing water, an organic solvent, and a polyurethane resin; and a discharging head including:

an individual liquid chamber including a circulation flow path through which the ink circulates; and a nozzle through which a liquid droplet of the ink is discharged, the nozzle communicating with the individual liquid chamber, wherein a solid content of the polyurethane resin in the liquid composition is 7% by mass or greater but 20.0% by mass or less.

<7> A liquid discharging method including circulating a liquid composition in an individual liquid chamber and discharging a liquid droplet of the liquid composition through a nozzle of a discharging head, wherein the liquid composition contains water, an organic solvent, and a polyurethane resin, and a solid content of the polyurethane resin in the liquid composition is 7% by mass or greater but 20.0% by mass or less.

<8> An inkjet printing method including circulating an ink in an individual liquid chamber and discharging a liquid droplet of the ink through a nozzle of a discharging head, wherein the ink contains water, an organic solvent, and a polyurethane resin, and a solid content of the poly urethane resin in the liquid composition is 7% by mass or greater but 20.0% by mass or less.

The liquid discharging apparatus according to any one of <1> to <5>, the inkjet printing apparatus according to <6>, the liquid discharging method according to <7>, and the inkjet printing method according to <8> can solve the various problems in the related art and achieve the object of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharging apparatus, comprising:
a container containing a liquid composition containing water, an organic solvent, and
a polyurethane resin; and
a discharging head including:
an individual liquid chamber including a circulation flow path through which the liquid composition circulates; and
a nozzle through which a liquid droplet of the liquid composition is discharged, the nozzle communicating with the individual liquid chamber,
wherein a solid content of the polyurethane resin in the liquid composition is 7% by mass or greater but 20.0% by mass or less,
wherein the polyurethane resin comprises both a polycarbonate polyurethane resin and polyester polyurethane resin, and
wherein a glass transition temperature of the polycarbonate polyurethane resin is −10 degrees C. or lower but −30 degrees C. or higher, and a glass transition temperature of the polyester polyurethane resins is 50 degrees C. or higher but 60 degrees C. or lower.

2. The liquid discharging apparatus according to claim 1, wherein the discharging head further includes:
a pressure sensor configured to detect a pressure of the liquid composition; and
a circulation speed control unit configured to control a circulation speed of the liquid composition to adjust the pressure of the liquid composition to a target pressure.

3. The liquid discharging apparatus according to claim 2, wherein the circulation speed control unit controls the circulation speed of the liquid composition to be higher when a detected value of the pressure sensor is lower than the target pressure.

4. The liquid discharging apparatus according to claim 1, wherein the solid content of the polyurethane resin in the liquid composition is 7.2% by mass or greater but 15% by mass or less.

5. The liquid discharging apparatus according to claim 1, wherein the proportion of water in the liquid composition is 20 to 60% by mass of the liquid composition.

6. The liquid discharging apparatus according to claim 1, wherein the solvent comprises 1,2-propanediol; 3-methoxy-3-methyl-1-butanol; 2,3,-butanediol, or 2,ethythexyl alcohol.

7. A liquid discharging method, comprising
circulating a liquid composition in an individual liquid chamber and discharging a liquid droplet of the liquid composition through a nozzle of a discharging head,
wherein the liquid composition contains water, an organic solvent, and a polyurethane resin, and
a solid content of the polyurethane resin in the liquid composition is 7% by mass or greater but 20.0% by mass or less,
wherein the polyurethane resin comprises both a polycarbonate polyurethane resin and polyester polyurethane resin, and
wherein a glass transition temperature of the polycarbonate polyurethane resin is −10 degrees C. or lower but −30 degrees C. or higher, and a glass transition temperature of the polyester polyurethane resins is 50 degrees C. or higher but 60 degrees C. or lower.

8. The method according to claim 7, wherein the solid content of the polyurethane resin in the liquid composition is 7.2% by mass or greater but 15% by mass or less.

9. The method according to claim 7, wherein the proportion of water in the liquid composition is 20 to 60% by mass of the liquid composition.

10. The method according to claim 7, wherein the solvent comprises 1,2-propanediol; 3-methoxy-3-methyl-1-butanol; 2,3,-butnediol; or 2,ethylhexyl alcohol.

11. An inkjet printing method, comprising:
circulating an ink in an individual liquid chamberchaaber and discharging a liquid droplet of the ink through a nozzle of a discharging head,
wherein the ink contains water, an organic solvent, and a polyurethane resin, and
a solid content of the polyurethane resin in the ink is 7% by mass or greater but 20.0% by mass or less,
wherein the polyurethane resin comprises both a polycarbonate polyurethane resin and polyester polyurethane resin, and
wherein a glass transition temperature of the polycarbonate polyurethane resin is −10 degrees C. or lower but −30 degrees C. or higher, and a glass transition temperature of the polyester polyurethane resins is 50 degrees C. or higher but 60 degrees C. or lower.

12. The method according to claim 11, wherein the solid content of the polyurethane resin in the liquid composition is 72% by mass or greater but 15% by mass or less.

13. The method according to claim 11, wherein the proportion of water in the liquid composition is 20 to 60% by mass of the liquid composition.

14. The method according to claim 11, wherein the solvent comprises 1,2-propanediol; 3-methoxy-3-methyl-1-butanol, 2,3,-butanediol, or 2,ethylhexyl alcohol.

* * * * *